(12) United States Patent
Leblanc et al.

(10) Patent No.: US 8,047,600 B2
(45) Date of Patent: Nov. 1, 2011

(54) TARP ENCLOSURE SYSTEM

(76) Inventors: Sheri Leblanc, Lancaster (CA); Tim P. Demonte, Toronto (CA); Walter P. Demonte, Windsor (CA)

(*) Notice: Subject to any disclaimer, the term of this patent is extended or adjusted under 35 U.S.C. 154(b) by 0 days.

(21) Appl. No.: 12/973,302

(22) Filed: Dec. 20, 2010

(65) Prior Publication Data
US 2011/0084514 A1    Apr. 14, 2011

Related U.S. Application Data

(62) Division of application No. 12/074,234, filed on Feb. 29, 2008, now Pat. No. 7,854,465.

(51) Int. Cl.
*B60P 7/02* (2006.01)
(52) U.S. Cl. .......... 296/100.18; 296/100.17; 296/100.01
(58) Field of Classification Search ............. 296/100.01, 296/100.11, 100.12, 100.17, 100.18
See application file for complete search history.

(56) References Cited

U.S. PATENT DOCUMENTS

| | | |
|---|---|---|
| 2,950,727 A | 8/1960 | H.S. Dunn |
| 3,415,260 A | 12/1968 | R.L. Hall |
| 3,469,587 A | 9/1969 | D. Folkes |
| 3,534,511 A | 10/1970 | M. Cappella |
| 3,875,623 A | 4/1975 | Johnston |
| 4,137,687 A | 2/1979 | Sprung |
| 4,789,196 A * | 12/1988 | Fields ................ 296/100.18 |
| 5,080,422 A | 1/1992 | DeMonte et al. |
| 5,152,575 A | 10/1992 | DeMonte et al. |
| 5,924,759 A | 7/1999 | DeMonte et al. |
| 7,325,855 B2 | 2/2008 | Henning et al. |
| 2008/0012378 A1 | 1/2008 | LeBlanc et al. |

* cited by examiner

*Primary Examiner* — Lori Lyjak
(74) *Attorney, Agent, or Firm* — Carrier Blackman & Associates, P.C.; Joseph P. Carrier; William D. Blackman

(57) ABSTRACT

A retractable tarpaulin cover system includes a tarp cover, plural spaced substantially U-shaped bows supporting and connected to the tarp cover, movable carriages operably connected to lower ends of each bow, and a tensioning mechanism which moves an end one of said bows toward an endmost position thereof to tension the tarp cover in an expanded position of the cover. The tensioning mechanism includes an elongate brace arm having an upper end which operatively engages an upper or intermediate portion of a vertically extending leg of the end bow, a transmission device which operatively supports a lower end of the brace arm and rotates the arm in a longitudinal direction of the cover system to thereby also move the end bow in the longitudinal direction of the cover system, and a coupling which detachably connects the lower end of the brace arm to the transmission device.

5 Claims, 15 Drawing Sheets

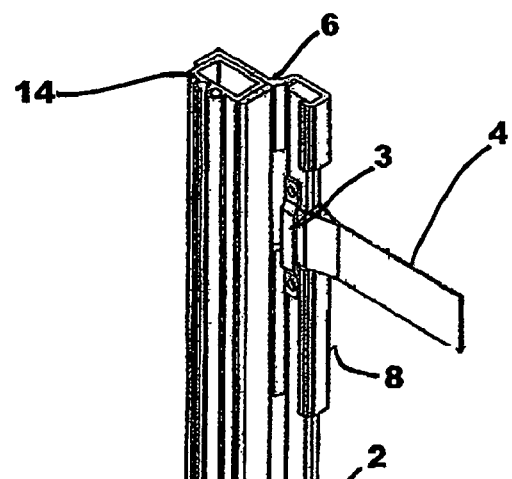
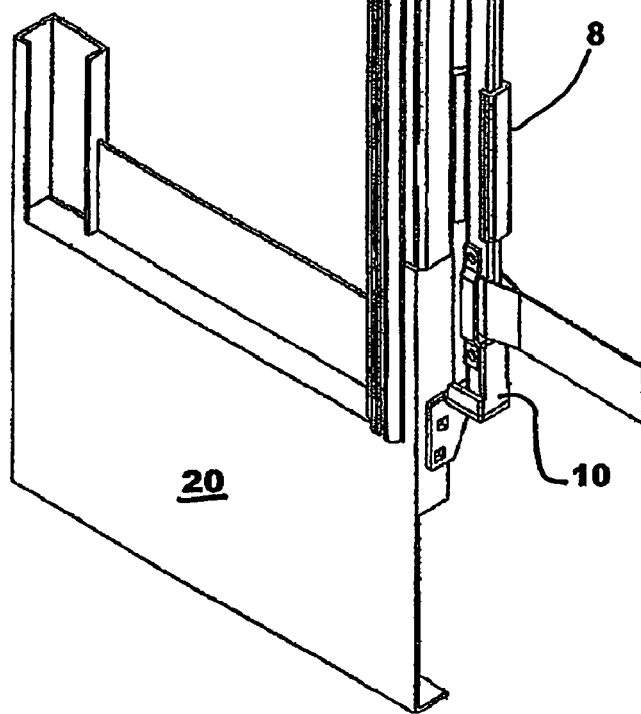
FIG. 2

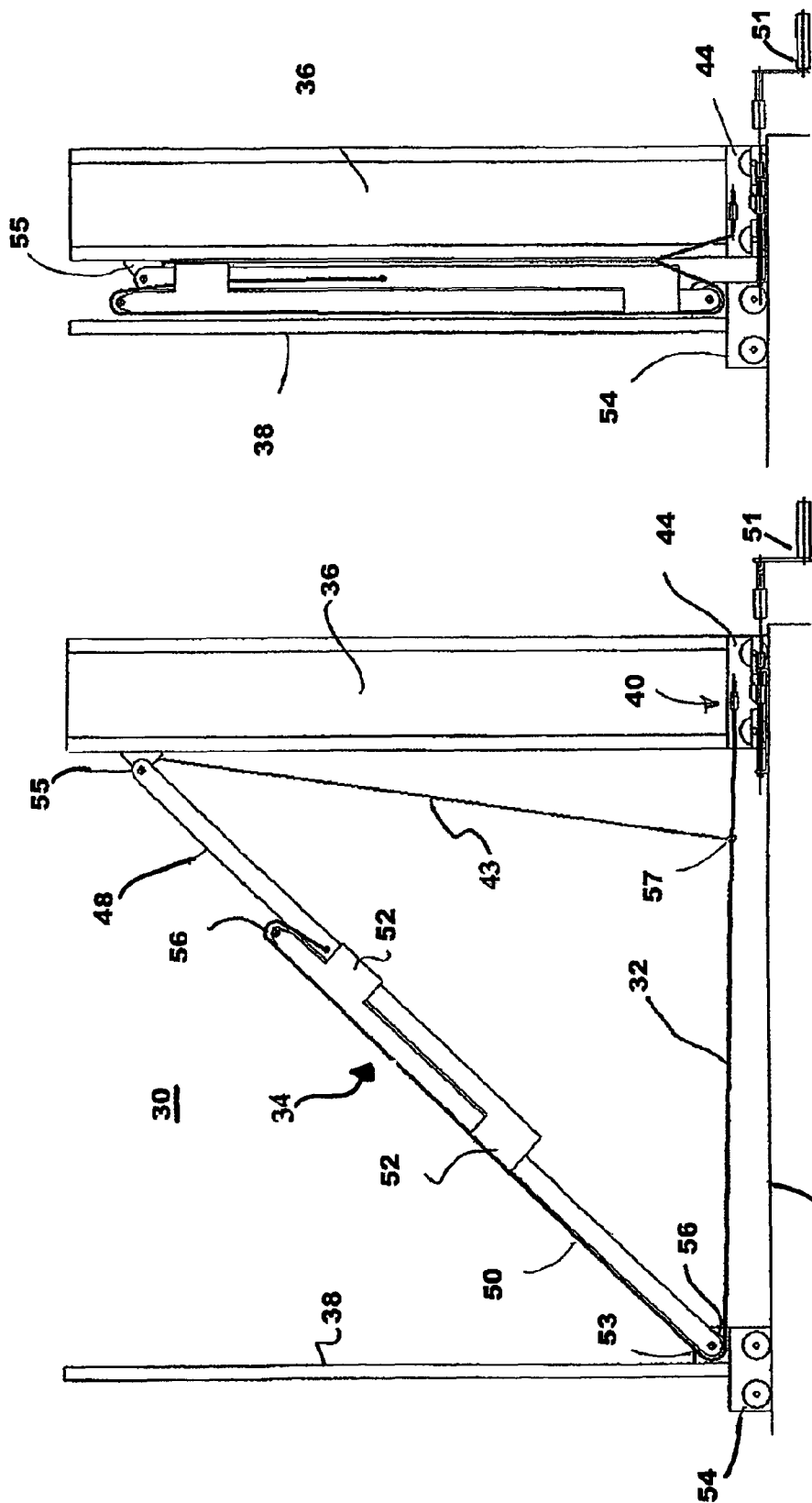

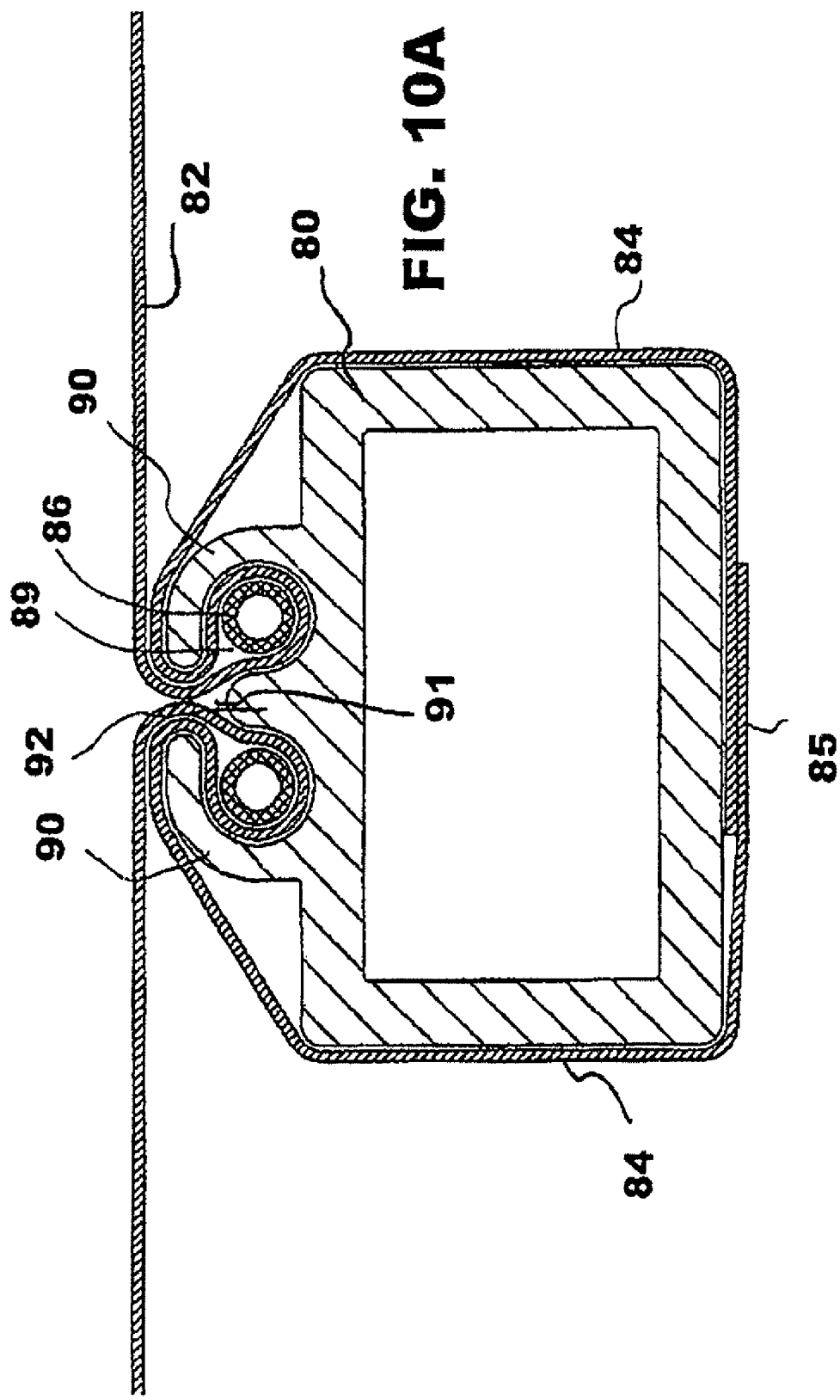

TARP ENCLOSURE SYSTEM

CROSS-REFERENCE TO RELATED APPLICATIONS

This application is a divisional of U.S. application Ser. No. 12/074,234 filed 29 Feb. 2008 (U.S. Pat. No. 7,854,465), which claims the benefit of U.S. Provisional Application No. 60/892,662, filed Mar. 2, 2007. The entire disclosures of the prior applications are incorporated herein by reference.

BACKGROUND OF THE INVENTION

1. Field of the Invention

This invention relates to an improved tarp enclosure system. More particularly, the invention relates to a retractable tarp enclosure system which may be used for covering substantially any area or object, including beds of trucks, trailers and the like, and which includes tensioning and locking mechanisms and a single piece tarp which make the system more efficacious and convenient to use than conventional systems.

2. Discussion of Background Art

Tarp covering and enclosure systems have long been known for use in a wide variety of applications, including tents, greenhouses and other space enclosures, awnings, swimming pool covers, vehicle load covers, etc. Some of the known systems are more complex than others including systems which are large, systems which are tensioned, systems which are movable, etc.

In larger systems it is often desirable to use a number of tarp sections which are joined together using connectors with retaining grooves or recesses which slidingly receive and retain enlarged edges of the tarp sections. By forming the tarps in sections, it is easier to manipulate the tarp and easier to replace individual sections when they become worn or damaged, for example. Some sectional tarp systems are disclosed in U.S. Pat. Nos. 2,950,727, 3,415,260, 3,469,587, 3,534,511, 3,875,623, and 4,137,687. Also, various components for making a sectional tarp cover have been readily available for decades under the trade name KEDER™, for example.

When a tarp cover system is movable, it will typically include wheeled carriages, skids, and/or other mechanisms which permit the cover system to be moved to various positions, and may include a drive assembly for facilitating the movement from a remote location. Also, a movable tarp cover system may include mechanism(s) for securing or locking the cover system in various positions, such as a fully closed/covering position and a fully retracted/non-covering position, and may also include mechanism(s) for tensioning the tarp cover for improved aerodynamics, appearance and durability.

Applicant has previously proposed several cover systems which may, for example, be used for covering loads on flatbed trucks/trailers as a so-called rolling type tarpaulin system. One such enclosure system shown in U.S. Pat. No. 5,924,759 includes a plurality of U-shaped bows supporting a flexible cover, and rails provided along opposite sides of the truck bed which support ends of the bows through wheeled carriages such that the tarp cover may be easily moved longitudinally along the bed permitting the tarp to be extended over the bed or collapsed in an accordion-like manner. See FIG. 14. Although not disclosed in U.S. Pat. No. 5,924,759, at least one of applicant's previously proposed systems includes locking mechanisms for the two ends of the tarp enclosure which also permit the tarp enclosure to be tensioned at either/both ends. This is desirable for an operator because it permits any portion of the flatbed to be conveniently exposed and covered. The disclosure of U.S. Pat. No. 5,924,759 is incorporated herein by reference.

While the conventional cover systems, including those previous systems proposed by applicant, are generally effective for their intended purposes, the conventional systems remain to be improved upon in various respects.

The Rear Tensioning and Locking Mechanisms

For example, in many truck mounted rolling type tarpaulin systems there is typically provided some type of tensioning mechanism associated with the rear end of the system, whereby when the system is in its fully closed position and the front bow is locked in position, e.g., in engagement with the headboard at the front of the truck trailer, the tarp cover can be stretched taut by moving the rearmost supporting bow rearwardly a few inches. One common tensioning mechanism involves use of a vertical post attached to the rear of the trailer extending upwardly approximately half the height of the rear bow and one or more tensioning straps which are used to pull the rear bow towards the post. The tensioning strap located near the center of the rear bow is usually too high for the operator to reach from ground level and requires the operator to climb on a step or the vehicle's bumper for operation of the tensioning strap. The post may be located inside the covering system so that it is not visible from the outside for aesthetic purposes, but this takes up valuable cargo space. The post may alternatively be located outside of the covering system to avoid reduction in cargo space, but detracts from the system's appearance. In either event, the post is typically removable for loading and unloading cargo, but the post is relatively heavy and creates a burden for the operator.

Another conventional rear tensioning mechanism is one involving a cam which pushes the rear bow rearwardly relative to the floor of the trailer, such as an over-center cam mechanism extended between a vertically intermediate section of the rear bow and the trailer floor, the mechanism being manually manipulated to effect and release a cam action. The cam action functions to both lock the rear bow in position and pushes it rearward to tension the tarp. Such conventional mechanisms are disadvantageous in that they generally concentrate tension to the bottom portion of the tarp system near the guide rail assembly placing an undue load on the support wheels, which is likely to lead to premature failure. The undue load is sustained during transport and with the addition of road vibrations, etc., and the support wheels tend to fail in a relatively short time. A simple cam lock typically can provide only a few inches of tensioning distance which may not be sufficient for the requirements of full size tarp systems for trucks and trailers, e.g., 18 wheeler-type, over the life of the system.

Systems of braces for providing tarp tension have been disclosed in U.S. Pat. Nos. 3,874,721, 4,721,336, 2,486,170, 3,064,667 and 3,326,598. However, all of these brace designs simply maintain the bows along vertical axes and involve tarp covers having little or no tension applied thereto. Correspondingly, none of these designs allow for adjustment of the tilt of the rear bow to achieve balance of any significant tensioning forces between the top and bottom of the end bow.

Applicant has previously proposed a tensioning and locking mechanism for the rear end of a truck mounted cover system which avoids the discussed disadvantages of the conventional post and cam mechanisms. Applicant's previous mechanism, shown on FIG. 11, is a generally triangular brace 100 which attaches to the floor of the truck trailer and has a rearwardly facing hook 102 at its upper end which is manually manipulated to engage a projection fixed to a vertically intermediate portion of the rear bow for thereby locking the rear bow onto the trailer. The brace includes an adjustable screw mechanism 104 operatively associated with the lower end of a diagonal leg 106 of the brace whereby an operator may rotate the screw mechanism with a crank handle 107 or the like for causing the lower end of the diagonal leg 106 to move horizontally toward the rear of the trailer, causing the upper end of the diagonal leg and the hook 102 fixed thereto to move rearwardly, which thereby forces the end bow rearwardly and tensions the tarp cover. The previous system allows for more than several inches of tensioning distance which is generally sufficient for producing high tension on the tarp for full size truck and trailer applications over the life of the tarp system. This previous system can be comfortably operated from ground level and is located inside the tarp system to maintain aerodynamics and aesthetics of the vehicle.

While applicant's previous tensioning and locking mechanism is a significant improvement over the conventional rear locking and/or tensioning mechanisms, it still remains to be improved upon in some respects, e.g., the brace occupies some space within the cover system that may otherwise be used to store cargo, which is particularly limiting when hauling high volume cargo such as lumber, building supplies, bins, etc. where every square inch of floor space is needed, and the brace must typically be removed when loading/unloading the trailer to avoid interference with the cargo being moved.

The Front Tensioning and Locking Mechanisms

As another example, some conventional mechanisms for tensioning and locking the front end of truck mounted rolling tarp systems to the front end of the truck trailer, e.g., to a headboard permanently fixed at the front end of the trailer, typically use mechanisms which are located externally to the cover system and the headboard. These are disadvantageous in that the mechanisms are exposed to the elements at all times and cause additional wind resistance when the truck is traveling. Other conventional mechanisms are provided within the cover system and/or the headboard, but perform only a locking function, e.g., connecting the front bow to the headboard. These are disadvantageous in that tensioning and de-tensioning of a cover system can only be preformed at the rear of the truck trailer. Thus, for example, if an operator desires to expose a portion of the trailer bed near the front of the trailer, the operator must first release cover tension at the rear of the trailer and unlock the front lock mechanism before he/she is able to move the front portion of the cover system to expose the front portion of the trailer.

Applicant has previously proposed a ratcheting-type tensioning and locking mechanism for the front end of a truck mounted cover system which avoids the discussed disadvantages of the conventional mechanisms. Applicant's previous mechanism, shown in FIGS. 12A, 12B, functions to simultaneously lock the front bow to the headboard and to tension the cover system by pulling the front bow forwardly relative to the rest of the system. The previous system includes, on each front corner of the vehicle, a ratchet mechanism 110 including a vertical rod (not shown) rotatably supported inside a corner of the headboard 112, an elongate pull bar 114 connected to vertical rod of the ratchet mechanism via one or more flexible straps 116, and one or more retaining hooks (not shown) connected to the front bow (not shown) which receive and hold the pull bar. For connecting the front bow to the headboard and simultaneously tensioning the tarp cover, an operator places the pull bar in the hook(s) and then operates the ratchet mechanism with an appropriate tool 118 such that the flexible strap(s) are wound around the vertical rod, thereby drawing the front bow into tight engagement with the headboard and tensioning the tarp cover. Such previous mechanism is advantageous because (among other reasons) it performs locking and tension functions, it is entirely disposed within the headboard and cover system except for a ratchet gear extending beneath a lower corner of the headboard, and is capable of applying a large amount of tension to the tarp cover.

While applicant's previous locking and tensioning mechanism for the front of the cover system is a significant improvement over the conventional front locking and/or tensioning mechanisms, it still remains to be improved upon in terms of ease of use—manipulation by an operator. Particularly, with the previous mechanism, the retaining hook(s) are connected to inwardly facing surface(s) of the front bow, extending and opening towards the rear of the system, such that the operator would have to reach around to the inside of the front bow for attachment and removal of the pull bar relative to the hook(s) as indicated in FIG. 12B. Under these conditions, the operator is working somewhat blindly and relies on his/her sense of touch and familiarity with the location of the hook(s) for placing the pull bar in and removing it from the hook(s). For example, a typical process for disconnecting the pull bar from the front bow hooks involves the operator grabbing the pull bar at an inner face of the front bow, lifting the bar a couple inches, and then moving the bar rearwardly a couple inches to free the bar from the hook(s). These steps are reversed when fitting the pull bar into the retaining hooks.

The Tarp Cover

In truck or trailer mounted cover systems, there are two conventional methods—mechanisms for connecting the tarp cover to the bows supporting same depending on whether the tarp is a single large piece or a plurality of sections which are connected together via the bows or other appropriate connectors. Examples of the conventional methods are shown in FIGS. 13A-13C. In the single piece tarp system of FIG. 13A, the single piece tarp 120 is connected to a supporting bow 122 using smaller pieces of tarp material 124 which are sewn or otherwise fastened to the inside face of the tarp so as to form pockets through which the bow is extended. The pockets may be quite small, e.g., a few inches in depth, or any size up to the continuous full width of the tarp. Conventional single piece tarp systems are disadvantageous for at least three reasons. First, the single piece tarp may be very large, e.g., a full length and height rolling tarp system for a 45 foot long trailer may be 45 long and 25 feet wide, and require several persons to manipulate same for installation and removal. Second, it is difficult to repair or replace any portion of the tarp, e.g., even if only a small portion of the tarp has been damaged. Third, it is difficult to sufficiently hold a single piece tarp tight against all of the bows in a large covering system, and if a rolling type tarp system on a large trailer allows movement between the tarp and bows it may reduce the longevity of the tarp material and otherwise does not have a favorable aesthetic appearance.

In the multiple piece tarp system of FIG. 13B, the individual tarp segments 126 typically have enlarged edges 126a, e.g., with a piece of rope or the like sewn within the edge that has been folded over the rope, and the enlarged edges may then be slidably inserted into openings or grooves formed in opposite sides of supporting bows/connectors 128. The cross sectional shape of the connector in FIG. 13B is very common and conventional. The multiple piece tarp system of FIG. 13C is a system previously proposed by applicant. In this system, the connector bows are different from the connector of FIG. 13B in that the bow includes a hollow tubular portion with a single groove/recess formed on one face of the tube, and the groove has two lobes which receive the enlarged edges of a pair of tarp segments. With this construction the bow is desirably hidden from view on the outside of the system because the bow is covered by the tarp segments.

Numerous segmented systems have been conventionally available for many decades, including connectors formed from a single molded or extruded piece, connectors formed in multiple pieces which are joined together, etc., but the connectors all function similarly to slidingly receive and retain the enlarged edges of the cover sections such that each cover section may be removed from the system, e.g., for repair or replacement, without removing any other segment. Some segmented tarp system components have long been available as off-the-shelf items sold under the trade name KEDER™, for example, which may be used to create a segmented tarp cover for any given application.

The conventional segmented cover systems overcome the disadvantages of the single piece tarp systems, but introduce some other potential disadvantages. One potential disadvantage is that water may leak through the connection between two adjacent tarp segments, especially with connectors formed as hollow members and where a bow/connector is formed from several parts which are bolted or otherwise connected together as is commonly done at transitions in bows at such right angle corners. For example, applicant has previously proposed a multiple piece bow/connector for a rolling tarp system including upper corner sections which are constructed quite different from the other sections which are simple straight extrusions because the corners require greater strength. Another potential disadvantage is that water may condense on the bows when the cover system moves through different environments with different temperatures such as when moving into or out of a climate controlled building. The tarpaulin material is relatively thin and can change temperature much faster than the bow material, typically extruded aluminum, which is large and thick in comparison to the tarpaulin material. Thus, for example, the condensation from the atmosphere within the cover system may condense as droplets on the bow surfaces and drop onto cargo covered by the system. Still another potential disadvantage is that the extruded aluminum bows are typically non-anodized, such that they can be extruded into desired shapes very easily and inexpensively. However, the non-anodized aluminum forms a natural oxidation on its outer surface which may leave undesirable black marks on any object that the bows contact. For some types of cargo, it would be undesirable to have such black marks formed thereon. Yet another disadvantage of segmented systems is that the segments tend to move along the bow/connector over time, especially when the cover system is mounted on truck trailer or other moving support, such that adjacent segments may become somewhat misaligned relative to each other. If the tarp has graphics, e.g., a company's name or logo, printed across two or more segments the graphics may have an undesirable jagged appearance due to the misalignment.

Thus, a need still exists in the art for an improved tarp enclosure system which addresses and overcomes the above-discussed disadvantages.

SUMMARY OF THE INVENTION

The present invention has been created with the intention of meeting the discussed need.

It is an object of the present invention to provide a rolling type tarpaulin cover system for a flatbed trailer including an improved tensioning mechanism for the rear end of the system which evenly distributes tension applied to a vertically extending portion of a rear bow by allowing adjustment of the bow's tilt and is compactly arranged such that it does not interfere with cargo carried on the trailer.

It is another object of the present invention to provide a rolling type tarpaulin cover system for a flatbed trailer including an improved tensioning and locking mechanism for a front end of the system which is easy and convenient to operate, and is compactly arranged mostly within the trailer headboard.

It is yet another object of the present invention to provide a continuous or single piece tarpaulin cover system which achieves the advantages normally associated with both segmented tarpaulins and conventional single piece tarpaulins while avoiding disadvantages associated with each of these methods.

It is a further object of the present invention to provide a tarpaulin cover system which better isolates the supporting bows/connectors thereof.

According to a first aspect of the present invention, there is provided a movable tarp enclosure system comprising: a tarp cover; a plurality of substantially inverted U-shaped bows connected to and supporting the tarp cover; rolling carriages connected to lower ends of said bows; a pair of guide rails operatively supporting said carriages at opposite sides of said bows, respectively, such that the carriages may be rolled along the rails to establish operative positions of the system; and a brace which distributes tension of said tarp cover between vertically spaced portions of an end one of said bows and an adjacent one of said bows, wherein said brace is disposed substantially entirely between the vertical portions of said end bow and said adjacent bow. In other words, the brace does not project laterally of the vertical portions of said end and adjacent bows. The brace may remain connected to the end and adjacent bows when the system is moved between the operative positions thereof, and when extended the brace distributes tensioning forces to vertically spaced portions of said end bow.

Such tarp enclosure system according to the first aspect of the invention desirably reduces stresses applied to the wheels of the rolling carriage supporting the end bow due to the tension forces on the tarp cover, does not take up valuable usable storage space within the enclosure system, and need not be removed and replaced by an operator when cargo is moved into or out of the enclosure system.

According to a second aspect of the present invention, there is provided a movable tarp enclosure system comprising: a tarp cover; a plurality of substantially inverted U-shaped bows connected to and supporting the tarp cover; rolling carriages connected to lower ends of said bows; a pair of guide rails operatively supporting said carriages at opposite sides of said bows, respectively, such that the carriages may be rolled along the rails to establish operative positions of the system; a headboard operatively associated with an end one of said bows, and a mechanism which locks said end bow to the headboard and tensions the tarp cover. The mechanism includes manually manipulable (interlocking) components for connecting the headboard to the end bow which are directly visible and accessible to an operator standing outside of the tarp enclosure system when tarp cover tension is released. The interlocking components may include a lock bar, together with a holding bracket connected to said end bow, projecting forwardly therefrom, and adapted to removably receive and retain the lock bar. The locking and tensioning mechanism may further include a vertically extending rod rotatably supported by the headboard, a flexible strap connecting the lock bar to the vertically extending rod and which wraps and unwraps relative to said rod when the rod is rotated, and a ratchet device connected to the vertically extending rod for rotating the rod. Substantially the entire locking and tensioning mechanism may be disposed between the headboard and the end bow within said tarp enclosure system.

The tarp enclosure system including such locking and tensioning mechanism according to the second aspect of the invention desirably combines advantages of an internally disposed locking and/or tensioning mechanism, such as favorable appearance and aerodynamics, with safe and easy operation by a person standing outside of the system, and also provides a more compact arrangement than conventionally possible.

According to a third aspect of the present invention, there is provided a tarp enclosure system comprising: an integral, unitary tarp cover; and a plurality of connectors supporting the tarp cover; wherein each of said connectors is connected to two portions of said tarp cover spaced from each other in a direction perpendicular to a longitudinal direction of the connector. For example, in a rolling-type tarpaulin system for flatbed trailers, including U-shaped tarp supporting bows, the bows may function as the connectors, and upper central portions of the bows which extend transversely and substantially horizontally over the trailer bed may be connected to two portions of said tarp cover spaced from each other in a longitudinal direction of the trailer. Optionally, the tarp cover may substantially surround or enclose the central portions of the connectors or the entire connectors.

Such tarp enclosure system according to the third aspect of the invention desirably combines advantages of a single piece tarp cover system, including a high degree of water-tightness, with ease of maintenance conventionally associated with a segmented tarp cover system. Water-tightness is achieved because there are no gaps or openings formed along the single piece tarp. Further, when the tarp surrounds or encloses portions of the connectors, then any condensation which may form on such portions is captured by the surrounding sections of tarp and may be safely channeled away from cargo disposed therebelow within the tarp system. On the other hand, because the tarp cover is connected to each connector at two spaced portions of the tarp cover, if a section of the tarp cover becomes damaged, then a section of the tarp cover between two of the connectors may be readily removed by cutting one of the connected portions near each of two adjacent connectors bounding the damaged section. A new replacement section may then be connected to the two adjacent connectors in place of the section that was removed.

For a more complete understanding of the present invention, the reader is referred to the following detailed description section, which should be read in conjunction with the accompanying drawings. Throughout the following detailed description and in the drawings, like numbers refer to like parts.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

There have been chosen specific embodiments of a cover system according to the invention and specific alternative structures and modifications thereto, the embodiments chosen for the purposes of illustration and description of the structure and method of the invention are shown in the accompanying drawings forming a part of the specification.

BRIEF DESCRIPTION OF THE DRAWINGS

FIG. 2 is an outside perspective view of a vertical side portion of an end bow disposed on a supporting carriage and some associated components of the locking and tensioning mechanism of FIG. 1.

FIG. 5 is a front view of a tensioning mechanism including a balance brace according to an embodiment of the present invention with the brace in a tensioning position thereof.

FIG. 6 is a front view of the mechanism of FIG. 5 with the balance brace in a non-tensioning (i.e. collapsed) position thereof.

FIG. 10A is a cross sectional view of a supporting bow and a single piece tarp connected at two separate connection points according to an embodiment of the present invention.

DETAILED DESCRIPTION OF THE INVENTION

A number of selected illustrative embodiments of the present invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. These illustrative embodiments are tensioning and locking devices for tarp enclosure systems being mounted on flatbed trailers, other vehicles or the like, and various components of such systems.

End Bow Tensioning and Locking Mechanism

First Embodiment

Figure 12A:
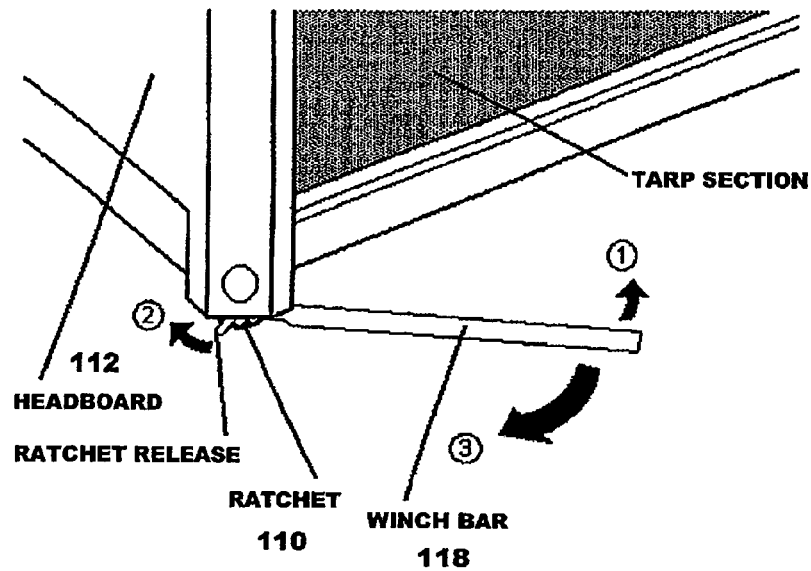
FIG. 12A is a perspective view of a lower portion of a ratcheting-type tensioning and locking mechanism previously proposed by applicant for interconnecting a headboard and a front bow in a rolling tarpaulin cover system for a flatbed trailer.

Referring now to FIGS. 1-4 of the drawings, there is shown a tensioning and locking mechanism for an end of a rolling tarp enclosure system which connects to a headboard or the like, for example a system mounted on a flatbed trailer, according to a selected illustrative embodiment of the present invention. The illustrated embodiment is an improvement of applicant's prior system shown in FIGS. 12A, 12B.

Generally similar to applicant's prior system, the tensioning and locking mechanism 1 of the depicted embodiment includes a pull-bar 2, pull straps 4, holding brackets 6, 8, 10 fixed to an end (e.g., front end) bow 14 of the cover system, a vertically extending tube or rod 12 rotatably supported by a headboard 16 and connected to the pull bar 2 via the straps 4, and one or more ratchet devices (not shown but corresponding to the device 110 of FIG. 1) connected to the tube 12 for rotating the tube and locking it in position. The ratchet device is of the type well known in the art. The tube or rod 12 preferably has two ratchet devices thereon, one operable from the ground and one operable from the truck flatbed. Indicated at 20 is a wheeled carriage which supports the end bow 14 for rolling movement along a guide rail (not shown) in a manner such as disclosed in U.S. Pat. No. 5,924,759. In this type of cover system the end bow 14 and other tarp-supporting bows of the system may be generally U-shaped and a pair of the tensioning and locking mechanisms may be operatively associated with vertically extending side portions/legs of the end bow 14 for jointly tensioning and locking both sides of the end bow. In the present drawings, only one vertically extending side portion of the end bow 14 is shown in conjunction with one of the mechanisms 1, but the other side portion of the end bow would have another identical (mirrored) mechanism operatively associated therewith. Each of the mechanisms 1 may be operated independently of the other mechanism.

Figure 3:
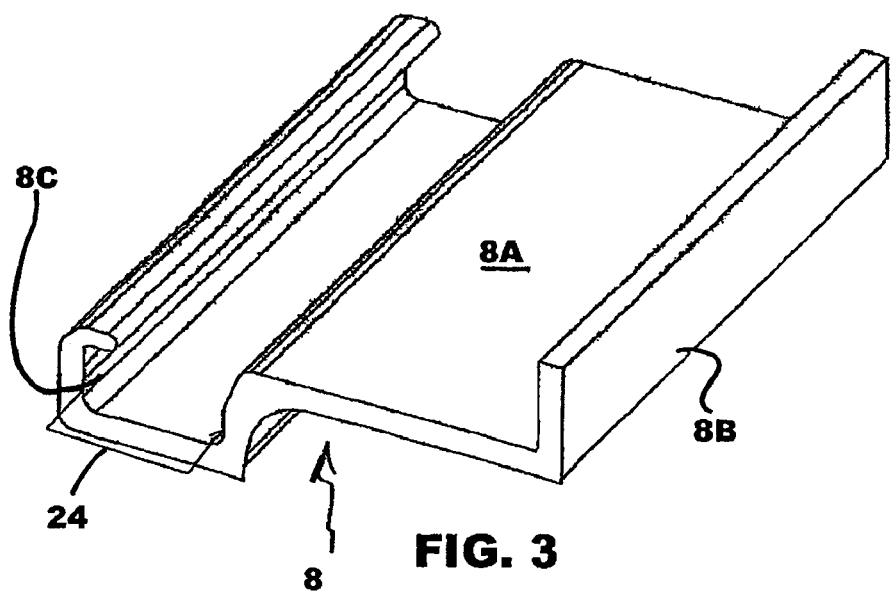
FIG. 3 is a perspective view of an upper and/or intermediate supporting bracket of the locking and tensioning mechanism of FIG. 1.
Figure 4:
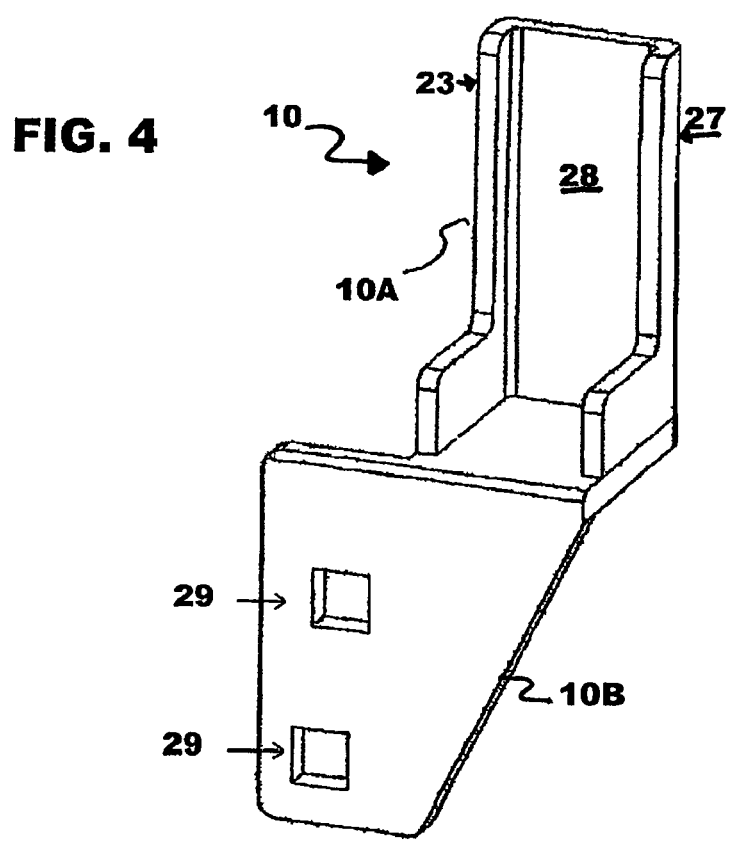
FIG. 4 is a perspective view of a lower supporting bracket of the tensioning and locking mechanism of FIG. 1.

The mechanism 1 is distinct from applicant's prior system, particularly in the structure and disposition of the brackets 6, 8, 10, the depicted embodiment including an upper bracket 6, two intermediate brackets 8 and a lower bracket 10, and in the structure of the pull bar 2 which is operatively retained by the brackets. One of the intermediate brackets is shown in FIG. 3 and the lower bracket 10 is shown in FIG. 4. As depicted, bracket 6 may have the same cross sectional shape but a shorter length as compared to the brackets 8. Of course, it is not required that the mechanism 1 according to the invention include four of the brackets 6, 8, 10 or that the brackets 6 and 8 have different lengths. For example, the mechanism 1 may include only the lower bracket 10 and the upper bracket 6, the brackets 6 and 8 could be identical, more than four total brackets could be used (especially if more than two of the straps 4 are used), etc.

Figure 1:
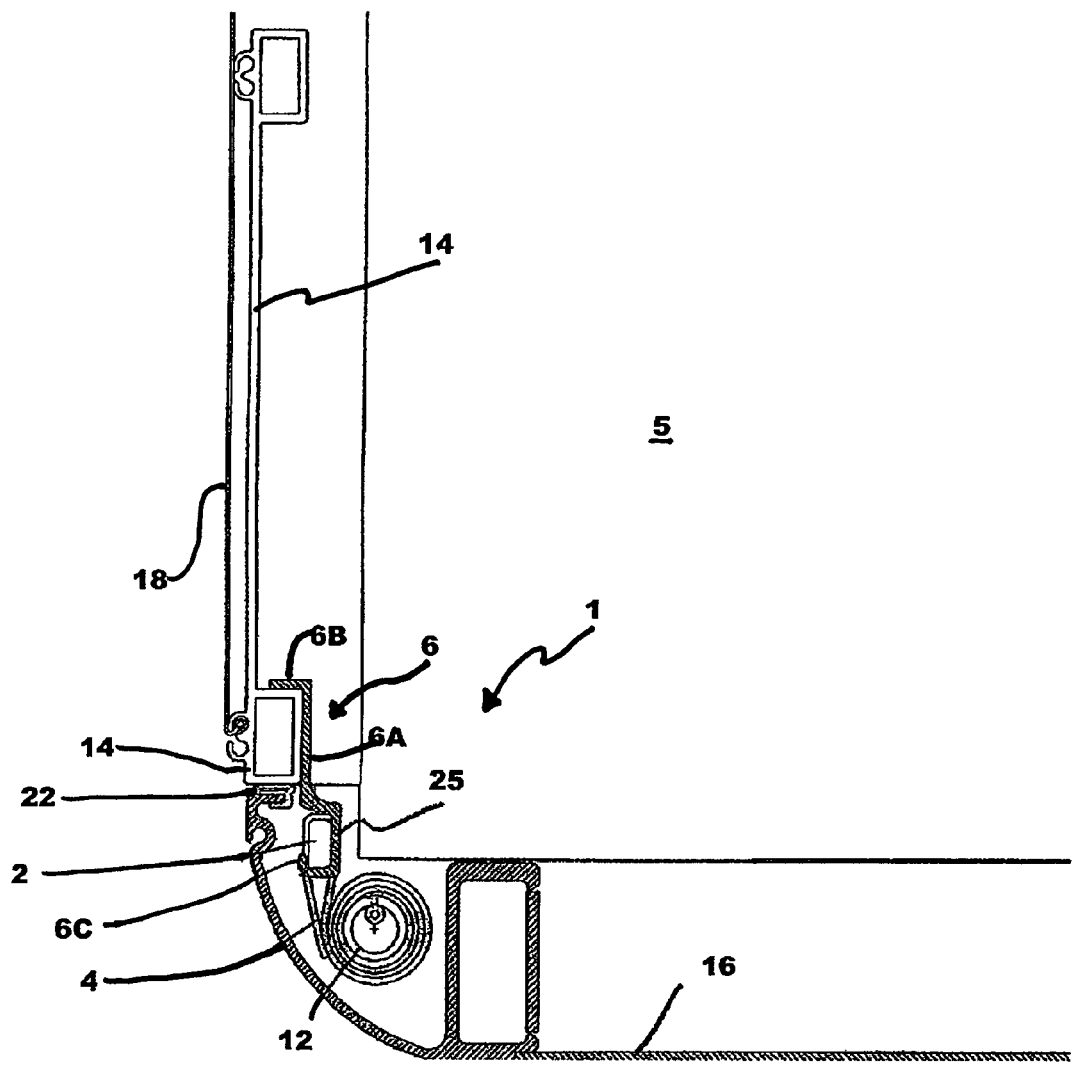
FIG. 1 is a cross sectional plan view of a tensioning and locking mechanism interconnecting an end bow and a trailer headboard according to an embodiment of the present invention.

Referring to FIGS. 2, 3, the bracket 8 in this embodiment includes a first portion 8a and a second portion 8b offset from the first portion such that when the second portion 8b is fixed to front bow, e.g., is welded thereto, the first portion projects inwardly of and longitudinally away from the front bow 14. This allows the pull bar 2 to be fit under in the lip portion 8c in the pull bar receiving portion 24. The bracket 6 has a corresponding structure as seen in FIG. 1, the bracket 6 has a lip 6c that forms the pull bar receiving portion 25. Similarly referring to FIGS. 2 and 4, the lower bracket 10 includes a first portion 10a and a second portion 10b offset from the first portion such that when the second portion 10b is fixed to front bow 14, e.g., is welded or bolted thereto by bolt holes 29, the first portion 10a projects inwardly of and longitudinally away from the front bow 14. Through such construction the projecting bracket ends may be compactly arranged within the headboard 16 closely adjacent to the vertical tube 12 when the end bow 14 and headboard 16 are drawn and locked together. As also depicted, the projecting ends of brackets 6, 8 include hooked portions which open facing outwardly of the cover system, while the projecting end 10a of bracket 10 forms a cradle 28 formed by sidewalls 27 which supports the lower end of the pull bar 2 and includes substantially open side faces which are open facing outwardly of the cover system which allows the pull bar 2 to be readily fit within the cradle 28.

Figure 12B:
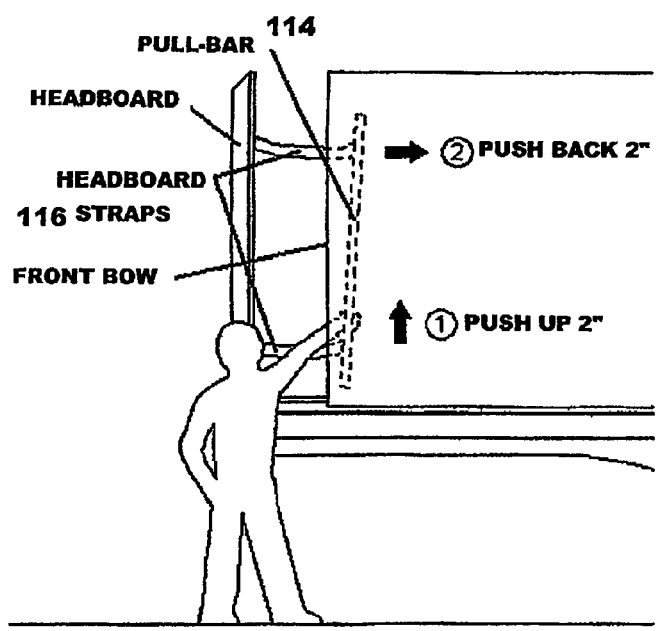
FIG. 12B is a schematic view of an operator removing or installing a pull bar of the mechanism of FIG. 12A into supporting hooks of a front bow of the system.

Such brackets 6, 8, 10 are quite different than the retaining hook(s) in applicant's prior system discussed above, again, because the hook(s) of the prior system are connected to inwardly facing surface(s) of the front bow, extending and opening towards the rear of the system such that the hooks are not directly visible to an operator standing outside the system, requiring the operator to blindly reach around to the inside of the front bow for attachment and removal of the pull bar 114 relative to the hook(s) as indicated in FIG. 12B. According to the depicted embodiment of the present invention, the outwardly facing hook projections 6c, 8c of the brackets 6, 8 and the outwardly facing open sidewalls 27 of the bracket 10 are directly visible and accessible to an operator standing outside the system when the tension on the tarp cover 18 is released via the ratchet device provided at the end of rod 12, such that the operator can easily manipulate the pull bar 2 into and out of the brackets 6, 8, 10 which are directly in front of the operator.

For facilitating the compact arrangement of the projecting bracket ends 6c, 8c, 10a within the headboard 16, the pull bar 2 may have significantly smaller cross sectional area than the bar 114 (FIG. 12b) of the prior system and the hooked portions 6c, 8c and the cradle portion 10a of the brackets 6, 8, 10 all have a significantly smaller cross sectional area than the hook(s) of the prior system. Such a compact arrangement desirably reduces space needed for the locking and tensioning mechanism 1, helps to prevent the tensioning and locking mechanism 1 from interfering with cargo supported on a flatbed trailer within the cover system, etc. As shown in FIG.

1, for example, the mechanism 1 does not extend at all into the cargo storage space defined above the upper surface of the flatbed trailer.

With reference to FIG. 2, the mechanism 1 may include a pair of the straps 4, one having an end fixed around an upper portion of the pull bar 2 and the other strap 4 fixed around a lower portion of the pull bar. Clips 3, for example, may be used to retain the strap 4 end relative to a given portion of the pull bar 2. As depicted, the upper strap 4 may be disposed between brackets 6, 8 and the lower strap 4 is disposed between brackets 8, 10 when the bar 2 is operatively fitted to the brackets and retained thereby. Through such an arrangement, the portions of the bar 2 being pulled by the straps 4 are well secured and retained, but the brackets 6, 8, 10 do not interfere with the straps 4. Of course, the mechanism 1 may include only one strap 4, e.g., disposed near a central portion of the bar 2, or may include more than two straps if desired. The straps 4 may be of any desired length to permit the pull bar 2 to be easily manipulated relative to the brackets 6, 8, 10 and to provide a sufficient amount of tension to the tarp cover. For example, the straps 4 could be approximately one meter in length, including ends which are secured to the pull bar 2 and the vertical tube 12, respectively.

For locking the end bow 14 in engagement with the headboard 16 and simultaneously tensioning a tarp cover 18 supported by the bow 14 and other bows, the operator places the pull bar 2 in the hooked portions of brackets 6, 8 and in the end portion 10a of the bracket 10, and then manipulates the ratchet device on the vertical tube 12 to wind the strap(s) 4 around the tube 12 until the front bow 14 is drawn into engagement with the headboard 16. Indicated at 22, a seal may be provided on the front edge of the front bow 14 and/or on the rear edge of the headboard 16 to prevent water, wind, etc. from entering any gap between the front bow 14 and the headboard 16. For releasing tension of the cover system and unlocking the front bow 14 from the headboard 16, the above steps are essentially conducted in the opposite order. Again, however, once the cover system tension is released, the operator can easily access the pull bar 2 and remove it from engagement with the hooked portions and the cradle portion of the brackets 6, 8, and 10.

While specific exemplary components of the first embodiment are described above, these may be replace with other appropriate components. For example, the single locking pull bar 2 could be replaced with multiple separate bars which operatively engage bracket(s) on the end bow and are simultaneously moved by the ratchet mechanism, the ratchet mechanism including the flexible straps could be replaced with a winch including a flexible steel cable connected to the pull bar, etc.

End Bow Tensioning Mechanism and Locking Device

Second Embodiment

Referring now to FIGS. 5-7B of the drawings, a tension distributing mechanism 30 and a tensioning and locking device 42 for an end bow of a tarp enclosure system according to a second embodiment of the present invention is shown. The second embodiment is quite different from the first embodiment in most respects due in part to the fact that the end bow in this embodiment is not connected to a large supporting member at one end of the trailer, such as the headboard 16 in the first embodiment, but is connected at a lateral side of a covered structure, e.g., to a lateral side of the truck trailer to which the cover system is mounted or to a guide rail operatively associated with a rolling carriage supporting the end bow on the truck trailer.

Generally, as best seen in FIG. 5, the tension distributing mechanism 30 according to the second embodiment includes a cable or other flexible member 32, a collapsible brace 34 operatively connected to the cable 32 and disposed diagonally between vertically extending portions of the end bow 36 and an adjacent bow 38 adjacent thereto, an adjustment device 40 operatively connected to the cable 32 for adjusting an operative length of the cable, and an (optional) elastic cord 43 which takes up slack in the cable 32 when the end bow 36 is in a non-tensioned, unlocked position thereof. Brace 34 is connected to end bow 36 via connection 55 at an upper or upper intermediate portion of the bow. Used in conjunction with the mechanism 30 is a tensioning and locking device 42, best shown in FIG. 7A, which fixes a rolling carriage 44 supporting the end bow 36 to a guide rail 45 in a rearmost, tensioned position thereof. Again, in this type of cover system the end bow 36 and other tarp-supporting bows 38 of the system may be generally U-shaped and a pair of the tension distributing mechanisms 30 and a pair of the tensioning and locking devices 42 may be operatively associated with vertically extending side portions/legs of the end bow 36 for jointly tensioning and locking both sides of the end bow 36. Also, the guide rail 45 could have a structure such as disclosed in applicant's prior U.S. Pat. No. 5,924,759. In the present drawings, only one vertically extending side portion of the end bow 36 is shown in conjunction with one of the mechanisms 30 and one tensioning and locking device 42, but the other side portion of the end bow would have another identical mechanism 30 and tensioning and locking device 42 operatively associated therewith, and another of the rails 45 would be on the opposite side of the trailer. Each of the mechanisms 30 may be operated independently of the other mechanism.

Figures 7A, 7B:
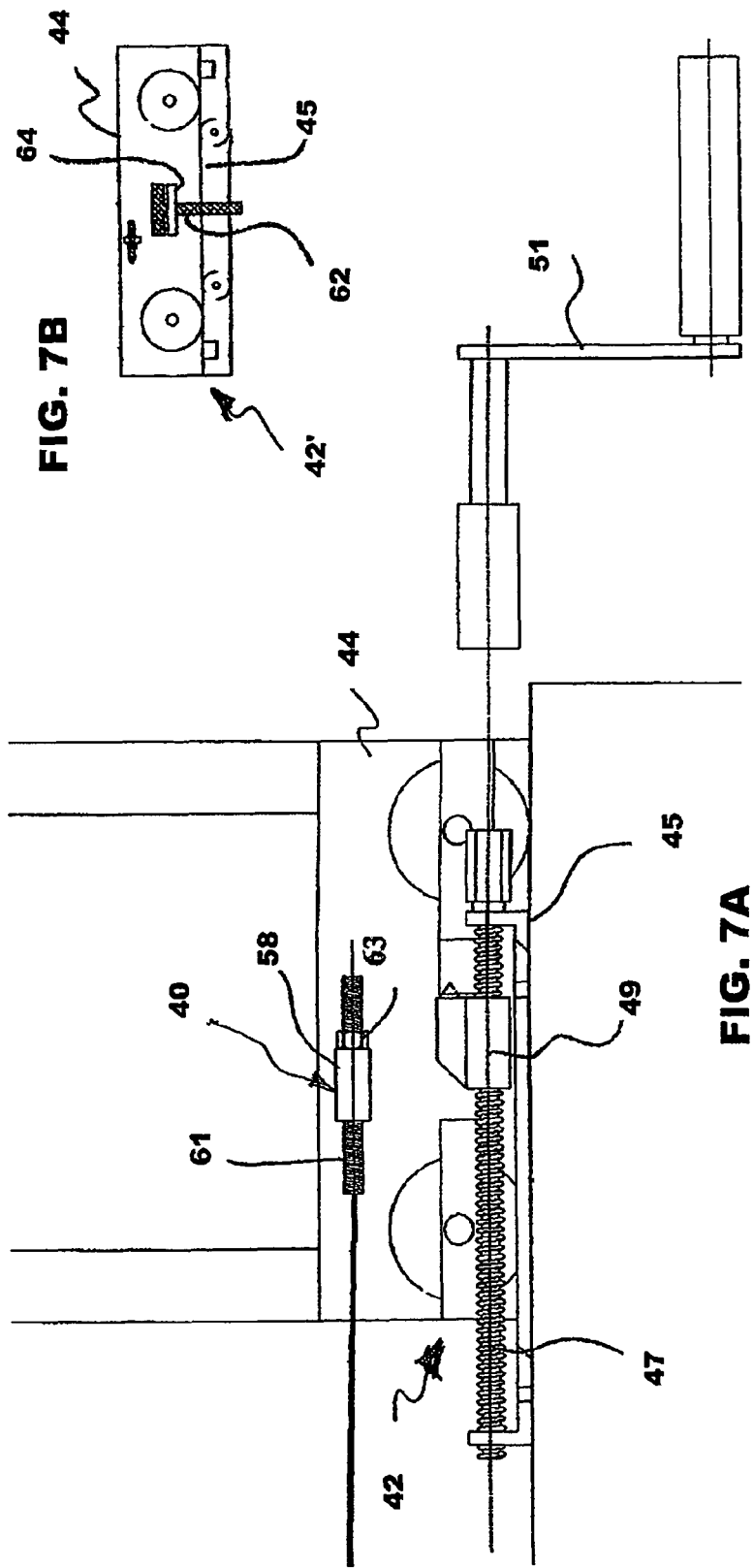
FIG. 7A is an enlarged view of manually manipulatable portions of the tensioning mechanism of FIG. 5.
FIG. 7B is an enlarged view of an optional locking device which may be used in conjunction with portions of the tensioning mechanism of FIG. 5.

Mechanism 30, shown in FIGS. 5 and 6 is used in conjunction with tensioning and locking device 42, shown in FIG. 7A. The tensioning and locking device 42 includes a threaded rod 47 that is positioned generally parallel to a guide rail 45,46 on which the carriage 44 is supported for rolling movement and provides the tensioning force to push the end bow 36 towards the end of the truck/trailer. A hook 49 on the threaded rod 47 engages the carriage 44 and draws the end bow 36 towards the end of the truck/trailer when it is rotated by crank handle 51. Tension at the bottom of the end bow 36 is supplied by the device 42 while tension is also distributed to an upper portion of the end bow 36 by mechanism 30. Balancing of the upper and lower tensioning forces on end bow 36 is accomplished by adjustment of the length of the cable 32 using adjustment device 40. In general, the end bow 36 may have a slight tilt away from the vertical axis when it is in its fully tensioned position.

Although tensioning and locking device 42 may be a manual device, as shown, it could alternatively or additionally be driven by a motor (not shown). It is also within the scope of the present invention that other devices may be used in place of device 42, including a ratcheting winch strap, a rack and pinion with a ratchet gear, a ratchet rack (without a pinion gear), an over-center cam lock, a pneumatic or hydraulic piston, an electric motor which winds/unwinds a cable, etc. In addition, as best seen in FIG. 5, the end bow 36 and its supporting carriage 44 are significantly larger and thus stronger than the intermediate bows 38 for additional strength at the ends and corners of the system.

The collapsible brace 34 in the depicted embodiment includes upper and lower elongate sliding sections 48, 50 which are slidably connected, e.g., through a pair of guides 52, with an upper end of the upper section pivotally connected to an upper or intermediate portion of the end bow 36 and a lower end of the lower section 50 pivotally connected to or near a lower end of the adjacent bow 38 or to a rolling carriage 54 supporting same. In addition, brace 34 may include a spring or shock absorber (not shown) to protect the brace 34 from damage or failure due to trailer flexure. Pulleys 56, 56 may be rotatably supported at opposite ends of the lower sliding section 50 for guiding movement of the cable 32 as discussed further below. With such construction, the sliding sections 48, 50 of the brace 34 may be moved between an extended position as shown in FIG. 5 (in which the bows 36, 38 are moved apart from each other) and a collapsed position as shown in FIG. 6 (in which the bows 36, 38 are moved adjacent to each other). The brace 34 may be constructed of appropriate materials such as steel or aluminum tubing.

The cable 32 may be an elongate flexible steel cable of appropriate thickness, e.g., ⅛"-⅜" diameter. In the depicted embodiment, one end of the cable is connected to the adjustment device 40 on the carriage 44 supporting the end bow 36, an intermediate portion of the cable is guided around the pulley 56 disposed at the lower end of the sliding section 50, another intermediate portion of the cable is guided around the pulley 56 disposed at upper end of the sliding section 50, and an opposite end of the cable is connected to a lower portion of the upper sliding section 48 and/or to the lower guide 52.

With particular reference to FIG. 7A, the adjustment device 40 may comprise a bracket 58 fixed to rolling carriage 44 supporting the end bow 36 and projecting laterally therefrom, and a pin 61 connected to the one end of the cable 32 and adjustably connected to the bracket such that the pin 61 may be moved relative to the bracket 58 for adjusting the operative length of the cable. For example, pin 61 may be a threaded rod that is adjustably held in position by threaded nut 63. Then the pin 61 and/or a portion of the nut 63 are rotated relative to each other for thereby moving the pin 61 axially in a longitudinal direction of the cover system which, again, adjusts the operative length of the cable 32. By appropriately adjusting the operative length of the cable 32 tensioning forces applied to upper and lower portions of the rear bow 36 by the cable 32 and the brace 34 can be desirably balanced at a given spacing between the end and adjacent bows 36, 38, e.g., when the end bow is locked in its end position and the tarp cover is tensioned substantially evenly at the top and bottom of the tarp system.

The height of hook 49 may be slightly higher than the engagement point on carriage 44 such that the hook 49 has an effect of slightly raising carriage 44 when the tarp is under tension. As another example, a cam lever (not shown) could be added to or near device 42 which would selectively engage a portion of the carriage 44 and lift it slightly above the rail 45 when the cover system is locked in its fully closed, tensioned position. This is advantageous because the device 42 then entirely bears the tensioning counter forces on the end bow 36 in the operative tensioned position of the system, rather than the wheels of the carriage 44. This is particularly desirable when the cover system is mounted on a truck trailer or the like because it greatly extends the durability of the wheels.

With the depicted construction, the tension distributing mechanism 30, the adjusting device 40 and the tensioning and locking device 42 may be operated as follows. For disposing the mechanism in an operative tensioning position thereof, the end bow 36 is forcibly moved to its end position by rotating the threaded rod 47 of device 42. When the end bow 36 is thus moved to the end position, the cable 32 is pulled together therewith and becomes tensioned, and the cable 32 correspondingly forces the brace 34 sections 48, 50 to slide away from each other until the brace 34 is in its fully extended position as shown in FIG. 5. The extending force of the brace 34 applies a force to the upper or intermediate portion of the end bow 36 in a direction away from the adjacent bow 38 while a tensioning force is applied to the lower portion of the end bow 36 through the tensioning and locking device 42. By appropriately adjusting the operative length of the cable 32 via the adjustment device 40, the tensioning forces at the upper and lower portions of the end bow 36 can be desirably balanced at the operative tensioned position of the tarp system. This prevents undue stresses from being applied to the wheels of the rolling carriage 44, because undue stresses would likely lead to premature wear of the wheels, especially if the cover system is mounted to a truck trailer or other moving object.

Such tarp enclosure system according to the second embodiment of the present invention is advantageous over conventional tensioning and locking mechanisms for several reasons. One advantage is that the brace 34 distributes tension of the tarp cover between vertical portions of the end and adjacent bows 36, 38, thereby reducing stresses that are applied to the wheels of the carriage 44 supporting the rear bow by the tensioned tarp cover. Another advantage is that mechanism 30 including the cable, the brace 34, etc. is disposed substantially entirely between the vertical portions of the end bow 36 and the adjacent bow 38, such that it does not project into the usable cargo space within the cover system. In other words, the lateral width of the mechanism 30 is substantially the same as that of the vertical portions of the bows 36, 38 on either side of the cover system. With truck/trailer mounted systems, this is an important feature because some conventional tensioning and locking systems, including applicant's prior system shown in FIG. 11, extend into the space above the flatbed trailer, reducing the usable cargo space on the trailer. Because they do not project into the cargo space, the mechanism 30 and the locking device 42 may remain connected to the end and adjacent bows 36, 38 at all times, such that an operator need not repeatedly remove and install the components when cargo is loaded within or removed from beneath the cover system.

As will be understood, the present invention encompasses variations and modifications to the specific embodiment shown in FIGS. 5-7A. For example, the brace 34 could include more than two sliding components 48, 50, different locking and tension adjusting devices could be used, etc. Also, With particular reference to FIG. 7B, there is shown a simple locking device 42' which may be used with some other types of tensioning mechanisms which, unlike mechanism 42, do not also provide a locking function. The device 42' comprises a threaded screw 62 rotatably supported by a portion of the rolling carriage 44 or a bracket 64 fixed to the carriage, and a threaded opening (not shown) formed in the guide rail 45 or in any other appropriate structure near the end of the cover system, e.g., for a system mounted on a flatbed trailer, the threaded opening for receiving the screw 62 may be formed in the steel frame at the side of the trailer, a bracket projecting from the side of the trailer, etc. A plurality of such threaded openings (not shown) may be provided spaced from each other in a longitudinal direction of the cover system, such as in rails 45 so that the screw 62 may selectively be engaged with an appropriate one of the openings. For example, when the tarp cover stretches with use over time, a different one of the openings would be selected.

End Bow Tensioning Mechanism and Locking Device

Third Embodiment

Figure 9:
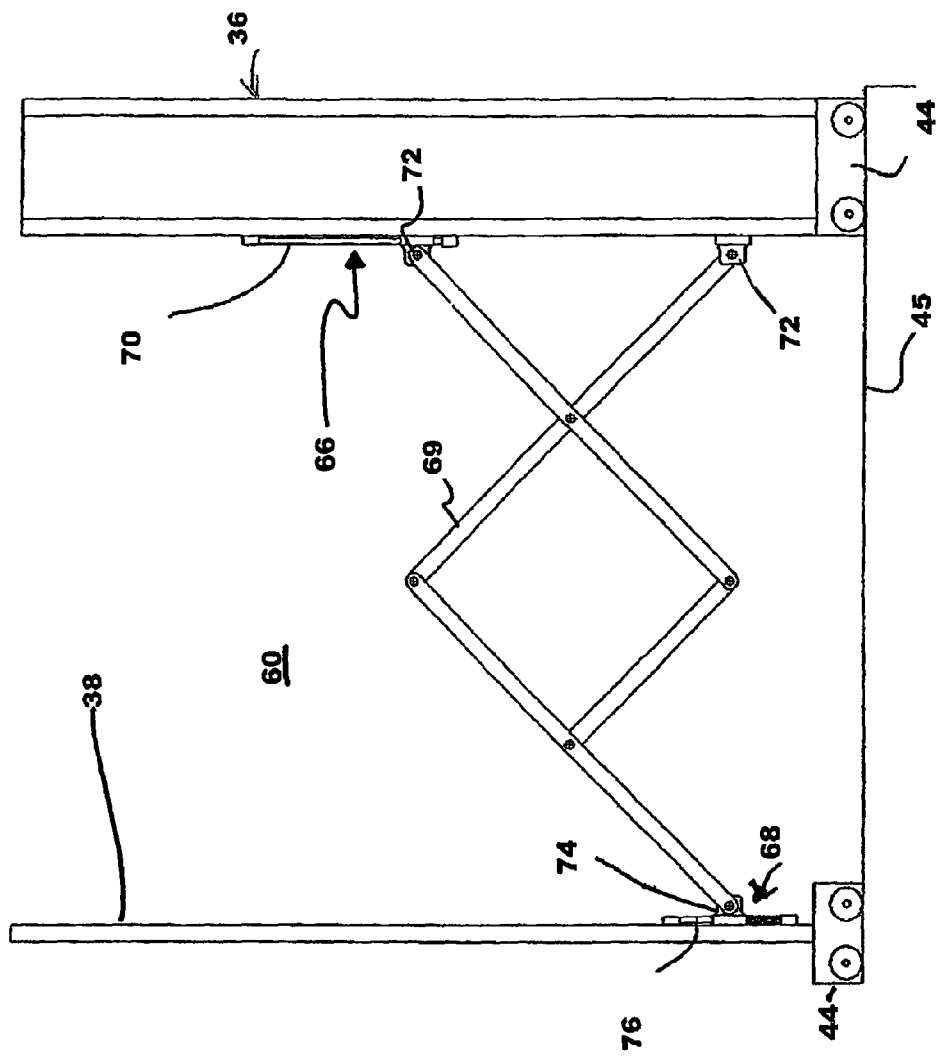
FIG. 9 is a front view of the mechanism of FIG. 8 in a tensioning position thereof.
Figure 8:
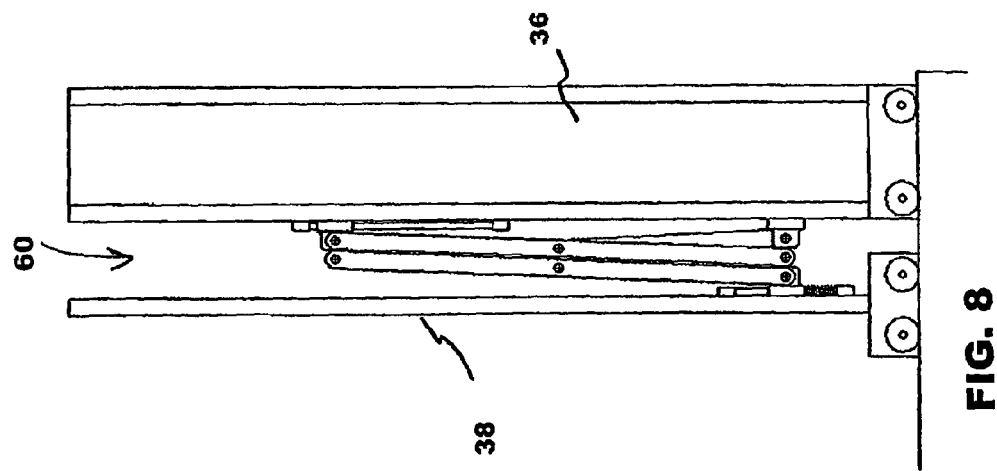
FIG. 8 is a front view of a tensioning mechanism according to another embodiment of the present invention with the mechanism in a non-tensioning position thereof.

Referring now to FIGS. 8, 9 of the drawings, a tension distributing mechanism 60 for an end bow of a tarp enclosure system according to a third embodiment of the present invention is shown, and which would be used in combination with appropriate tensioning and locking device(s) such as the device 42 shown in FIG. 7A, although the adjustment device 40 of FIG. 7A is not required for this embodiment. The mechanism 60 is somewhat similar to, and would be used instead of, the tension distributing mechanism 30 of the second embodiment for distributing tension to vertically spaced portions of the end bow of a rolling type tarpaulin system, e.g., bow 36. Like parts in the second and third embodiments are given the same reference numbers as used in the second embodiment and function in the same manner as the second embodiment. The following discussion addresses differences between the second and third embodiments.

Generally, the tension distributing mechanism 60 according to the third embodiment includes a collapsible, scissors-type brace 69 operatively connected between the end bow 36 and the adjacent bow 38, with one end pivotally connected to or near a lower end of the adjacent bow 38 at bracket 74 and two opposite ends pivotally connected to two vertically spaced portions at brackets 72 of the end bow 36. As depicted, the lower end may be pivotally connected to the end bow 36 through a fixed bracket 72, while the upper end may be pivotally connected to the end bow 36 through a linear slide device 66 such that the upper end of bracket 72 may be moved vertically along the upper portion of the end bow 36 as the brace 69 is moved between extended and collapsed positions thereof, and the one end of the brace 69 may be connected to the adjacent bow 38 through an adjustment device 68. Alternatively, the end could be connected to the bow 38 or the carriage supporting the bow via a bracket having a fixed position (not shown), rather than through the bracket 74 and the adjustment device 68.

As depicted, the linear slide device 66 may comprise an elongate rod or tube 70 attached to a vertical face of the end bow 36 in parallel thereto, and a bracket 72 which is connected to the tube 70 so as be freely slidable there along, and which has the upper end of the brace 69 pivotally connected thereto. With such construction the bracket 72 may slide to the lower end of the tube 70 when the brace 69 is in its expanded position shown in FIG. 9, while the bracket 72 may slide to the upper end of the tube 70 when the brace 69 is in its collapsed position shown in FIG. 8.

In the depicted embodiment, the end bow 36 is effectively prevented from tilting forward or backward due to the connection with the adjacent bow 38 through the brace 69 having the upper and lower ends connected to vertically spaced portions of the end bow at brackets 72, which is (again) desirable to avoid unnecessary stress being applied to wheel(s) of the carriage 44. Tilt is generally proportional to a ratio of upper tarpaulin tension to lower tarpaulin tension applied to the end bow by the tensioned cover. In the depicted embodiment, an amount of tilt of the end bow 36 can be adjusted based on the location of the connection between the brace end and the adjacent bow 38. It is desirable to have tilt that properly balances the tarp tension on the upper and lower ends of the end bow 36.

As depicted, the adjustment device 68 may comprise bracket 74 which pivotally supports the end of the brace 69, and a threaded member 76 operatively connected in parallel along a lower portion of the adjacent bow 38, which permits the position of the bracket 74 to be adjusted vertically up and down relative to the lower portion of the bow 38. Such adjustment is desirable to counteract changes in the ratio of the upper and lower tarpaulin tension on the end bow over time. As an alternative, or addition, to the threaded member 76, a spring loaded connection (not shown) could be provided between the bracket 74 and the bow 38, which spring loaded connection would permit the bracket 74 to move slightly up and down relative to the bow 38 when the cover system is moving, e.g., if it is mounted on a truck trailer for example. Such a spring loaded connection allows for dynamic changes to a ratio of the upper and lower tarpaulin tension on the end bow 36. Dynamic changes are possible, for example, under severe conditions such as a centrally and heavily loaded truck trailer traversing a pothole, railroad tracks, or the like. Under such conditions it is possible that the truck trailer's entire frame may flex significantly, which would also affect the ratio of the upper and lower tarpaulin tension on the end bow 36.

Since the tilt of the end bow 36 is maintained at all times by the brace 69 as discussed above, the carriage 44 for the bow 36 may be modified by eliminating one of the two wheels of the carriage. Of course, if two or more wheels are included with the carriage 44 for smooth operation when moving the end bow 36 and/or for load bearing capacity, an additional wheel or all wheels could be attached to the bottom of the carriage via a bogie or suspension (not shown) that allows for some tilt adjustment in the end bow. The tension distributing mechanism 60 and tensioning and locking device 42 according to the third embodiment achieves all of the same advantages as discussed above relative to the second embodiment, and also desirably maintains the tilt of the end bow at all times. As with the second embodiment, two of the tension distributing mechanisms 60 and the two of the tensioning and locking devices 42 according to the third embodiment may be used for jointly tensioning and locking a U-shaped end bow 36. Also, the mechanism 60 could be used in conjunction with other tensioning and locking devices such as discussed in relation to the second embodiment.

End Bow Tensioning Mechanism and Locking Device

Fourth Embodiment

Figure 15A:
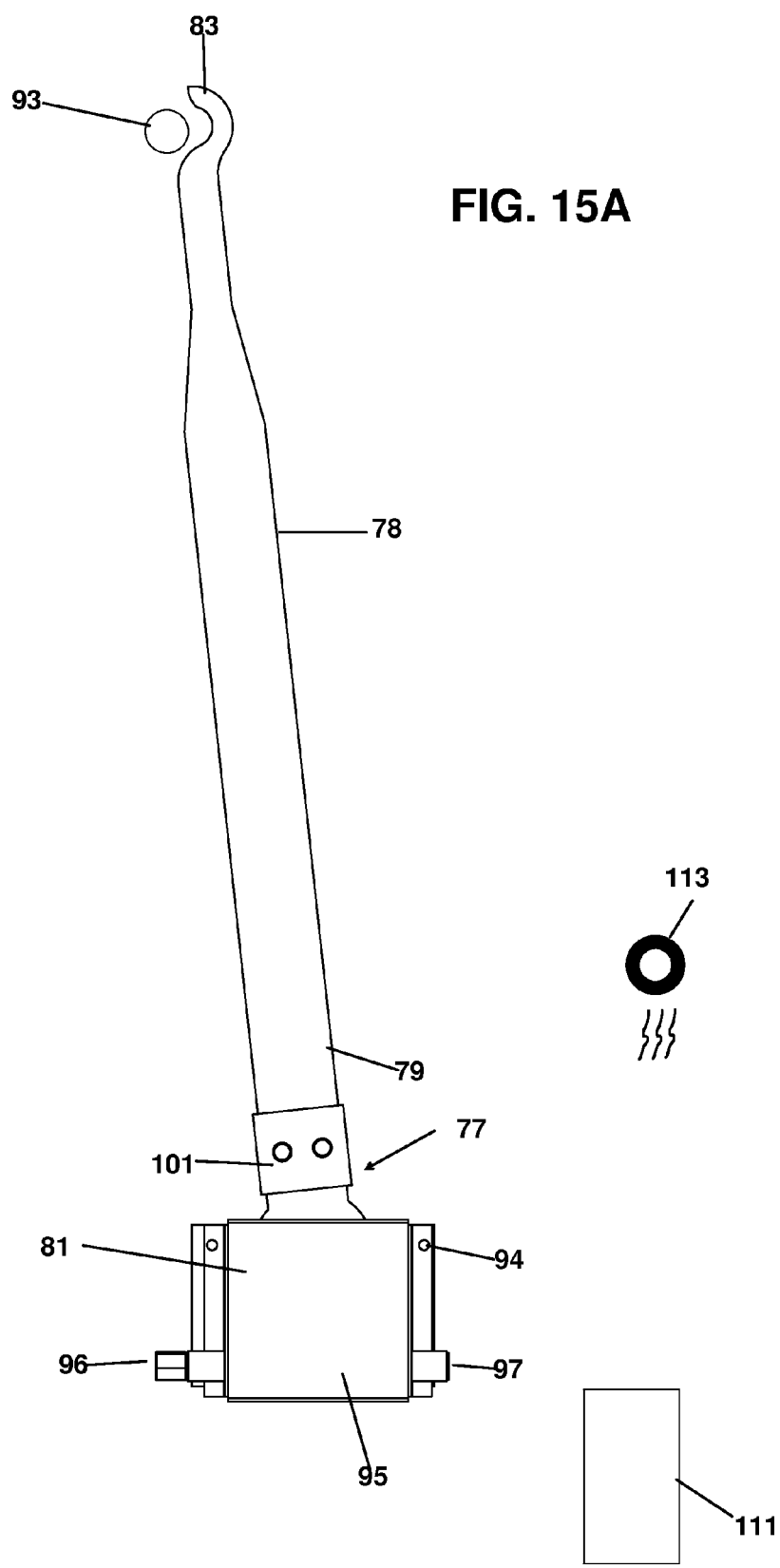
FIG. 15A is a perspective view of a fourth embodiment of a locking and tensioning mechanism for a tarp covering system according to the present invention.
Figure 15B:
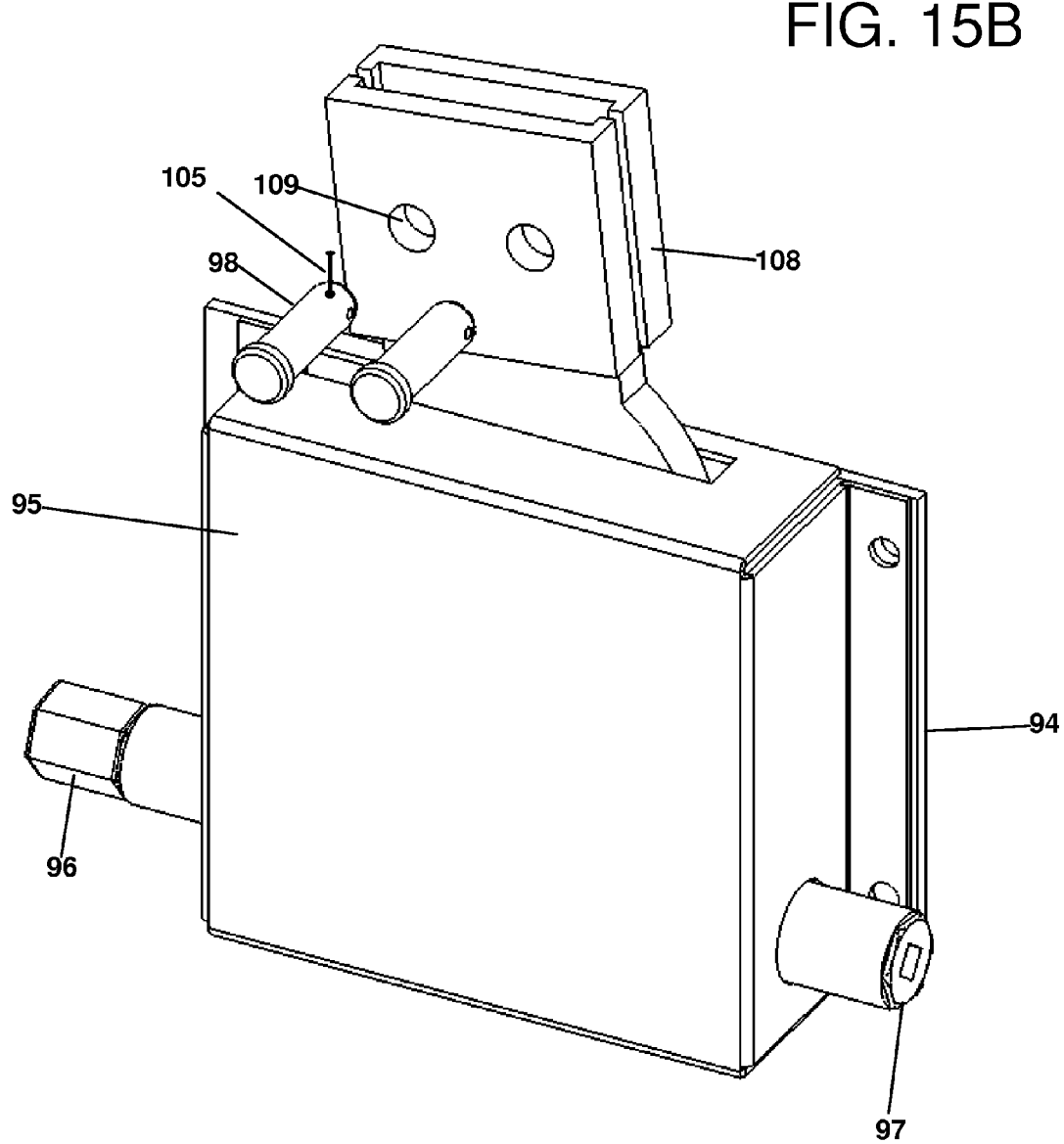
FIG. 15B is a perspective view of a lower, driving portion of the mechanism according to the fourth embodiment with an upper brace arm of the mechanism removed.
Figure 15C:
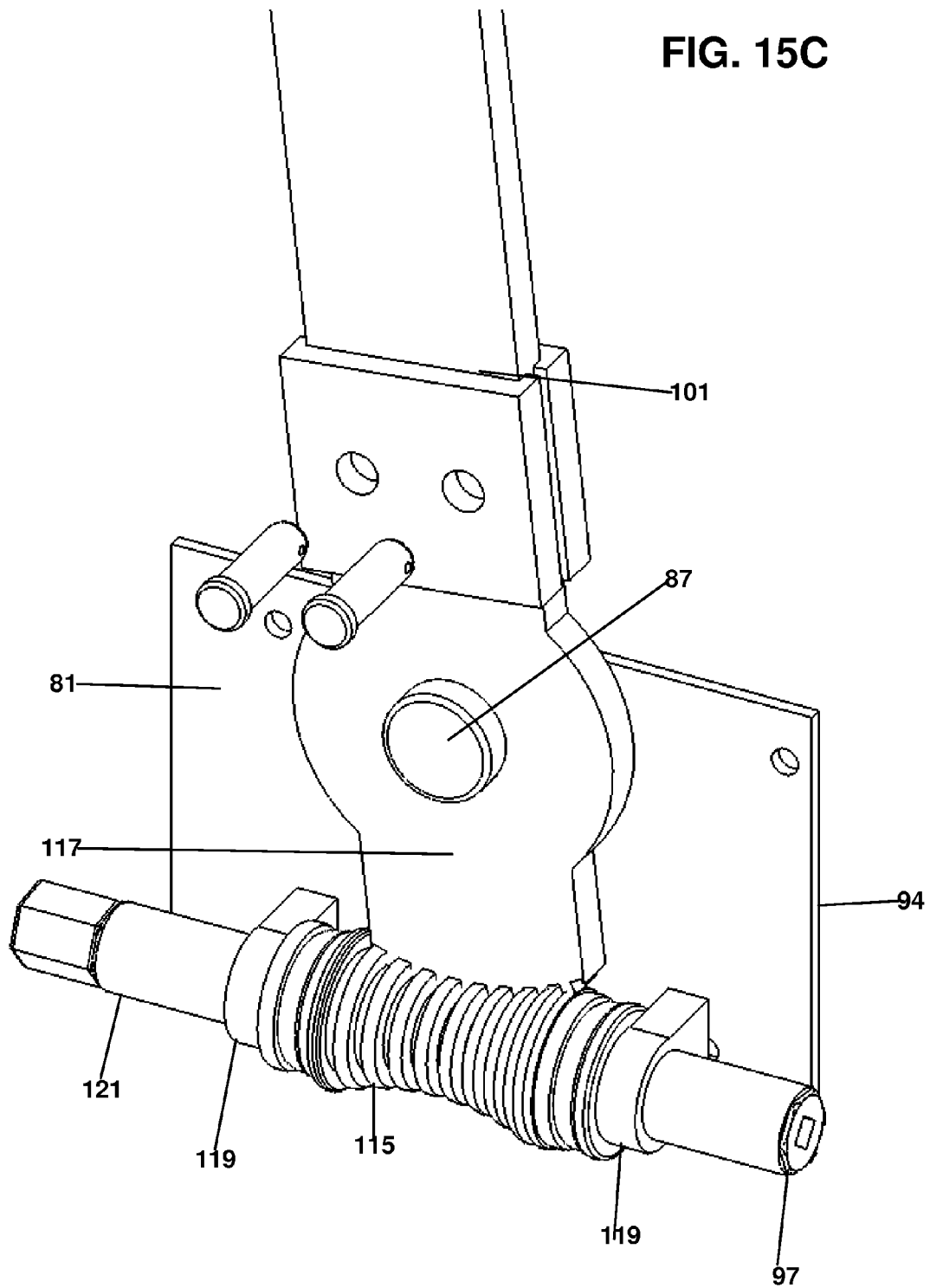
FIG. 15C is a perspective view of the mechanism according to the fourth embodiment with a cover of the mechanism removed to reveal a driving gearbox.

An end bow tensioning and locking mechanism 77 according to a fourth embodiment of the present invention is shown in FIGS. 15A-C, and comprises a power transmission or gearbox 81 and a brace arm 78 which is removable from the transmission, and is selectively rotated back and forth by the transmission. Brace arm 78 includes a first end 79 that allows the arm 78 to be interchangeably, reversible and removably attached to the transmission 81 and a second hooked end 83 that engages and supports an end bow of the cover system, such as bow 36, so that the bow can be moved together with the arm by the transmission. Arm 78 is attached to the transmission member 81 so that the hook 83 faces toward the end of a trailer or other support to which the cover system is mounted. The rearward-facing hook 83 is sized and positioned to engage a fixed projection (not shown) on the end bow 36, which projection is positioned at an intermediate or upper portion the end bow 36 such that when the hook is engaged to the projection the rear bow 36 is locked to the trailer. First end 79 of arm 78 may include attachment points that permit a secure connection to the transmission member 81. As depicted, the first end 79 may include a pair of apertures that allow a pair of connection members 98 to pass through both the first end 79, as well as through corresponding apertures 109 formed in a coupling 108 of the transmission member 81, while cotter pins 105 may be used to connect the members 98 to the first end 79 as shown. Of course other appropriate fasteners such as threaded bolts with nuts may be used instead of members 98 and pins 105.

Figure 11:
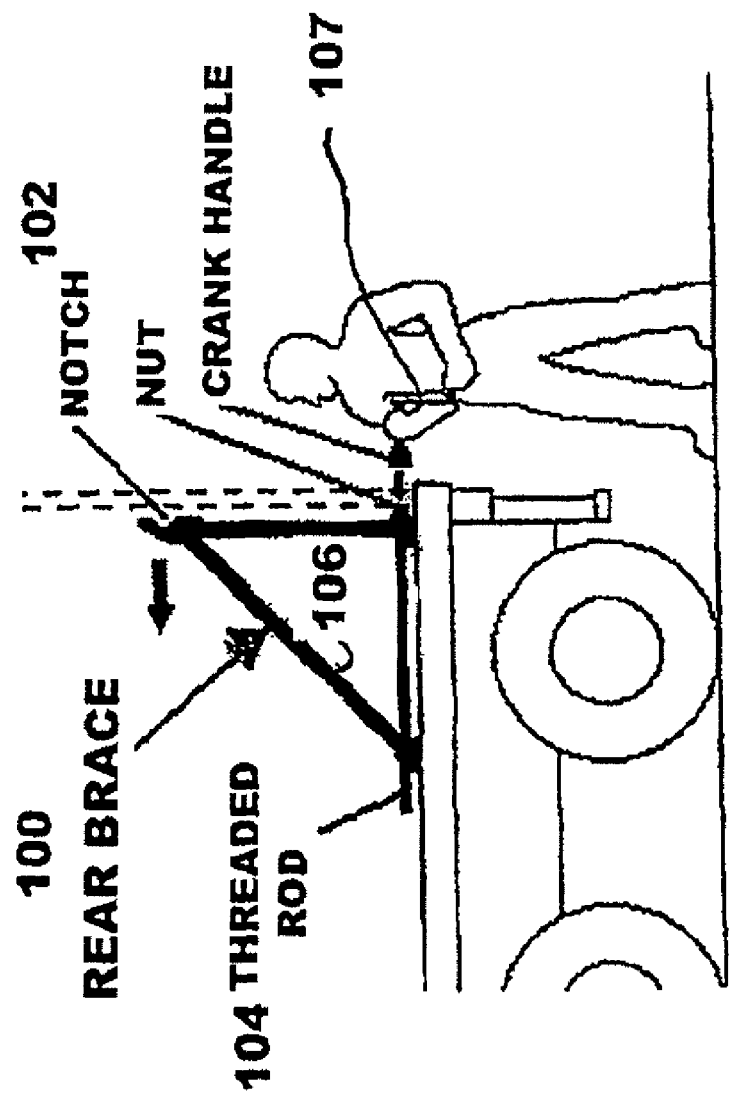
FIG. 11 is a front schematic view of a triangularly shaped locking and tensioning mechanism previously proposed by applicant in a rolling tarpaulin cover system for a flatbed trailer.

The transmission member 81 may comprise a support plate 94 which may be fixed to a lateral side of a trailer or other support on which the tarp cover system is mounted via bolts, welding, or any other appropriate fastening means, a case 95 which when fixed to the plate 94 defines a transmission chamber therein, gearing 115 fixed within the transmission chamber, such as a worm gear, gear 117 pivotably supported on a shaft 87 within the transmission chamber and operatively engaged with gearing 115 so as to be rotated by the gearing 115, a manual crank element 96 and a power-driven element 97 connected to opposite ends of gearing 115, and which may be respectively rotated by a manual crank such as crank 107 in FIG. 11 and a motor 111 for driving the gearing 115 in clockwise and counter clockwise directions, which then rotates the gear 117 about pivot shaft 87 to move the arm 78 forward or backward with respect to the vehicle. Disposition of the gearing 115, gear 117 within the transmission chamber protects these components from the elements and any type of material that may be encountered on the travels that may jam the gears and prevent operation of the transmission member 81. The case 95 may include openings that allow the passage of elements 96, 97 and the upper portion of gear 117 that attaches to the arm 78. The motor 111 which drives power-driven element 97 may be an electric, hydraulic, pneumatic, etc. type motor. Further, the system may optionally include an RF-type remote control 113 for the motor such that an operator may conveniently lock the end bow and tension the tarp cover, or un-tension the cover and unlock the end bow via the remote control.

Again, the gearing 115 may include a worm gear with a shaft 121 supported by bearings 119 attached to the support plate 94. Gear 117 may have teeth on a lower surface thereof which operatively engage with the gearing 115, and the coupling 108 is fixed to an opposite end of the gear 117. Coupling 108 may include halves that substantially surround the end of the arm 78, with each of the halves having apertures 109 defined therethrough.

The tensioning and locking mechanism 77 according to the fourth embodiment is somewhat similar to applicant's prior locking and tensioning mechanism shown in FIG. 11 in that the brace arm 78 with the hooked upper end is shaped similar to a vertically extending portion of the prior triangular brace 100 with the notched upper end 102, the hook 83 engages a fixed projection on a rear bow similarly to the notched upper end 102 for locking the end bow to the trailer, and the arm 78 is moved back and forth similarly to the vertically extending portion of the prior triangular brace 100 for tensioning the tarp cover. As readily apparent from the above discussion, however, the tensioning and locking mechanism 77 is quite different from the prior locking and tensioning mechanism shown in FIG. 11 in several respects.

Operation of the end bow tensioning and locking device according to the fourth embodiment is now described. For locking and tensioning the end bow 36, the arm 78 is connected to the transmission 81, the bow is manually moved close to and end of the trailer on which the cover system is mounted, e.g., by an operator who grabs the bow and pulls it towards the trailer end, the gearing 115 is then rotated via the manual or power-driven elements 96, 97 such that the arm 78 is rotated rearwardly, the hooked end 83 engages the fixed projection on the bow, and then the arm forcibly moves the bow 36 to a rearmost position thereof, thereby locking the bow in such position and placing the tarp under tension. Again, the arm 78 may be constructed such that the hook 83 extends slightly higher than the height of the fixed projection on the rear end bow 36 to provide a slight lifting action to the rear bow 36 and its supporting carriage 44 when the bow is its locked and tensioned position, to thereby take the force of the tension on the tarp system off the carriage 44 to allow for a longer service term for the carriage 44. Given that a pair of the end bow tensioning and locking devices according to the fourth embodiment would be used in conjunction with a U-shaped bow as discussed above, both such devices may be operated simultaneously or sequentially one after the other. For un-tensioning the tarp cover and unlocking the end bow 36, the above steps are performed in reverse order. Normally, the arm 78 should not interfere with any cargo stored on a trailer covered by the tarp system because the arm does not project laterally of vertical portions of the bow 36. Additionally, the arm 78 may be selectively removed from the transmission 81

Single Piece Tarp Cover

Figure 10B:
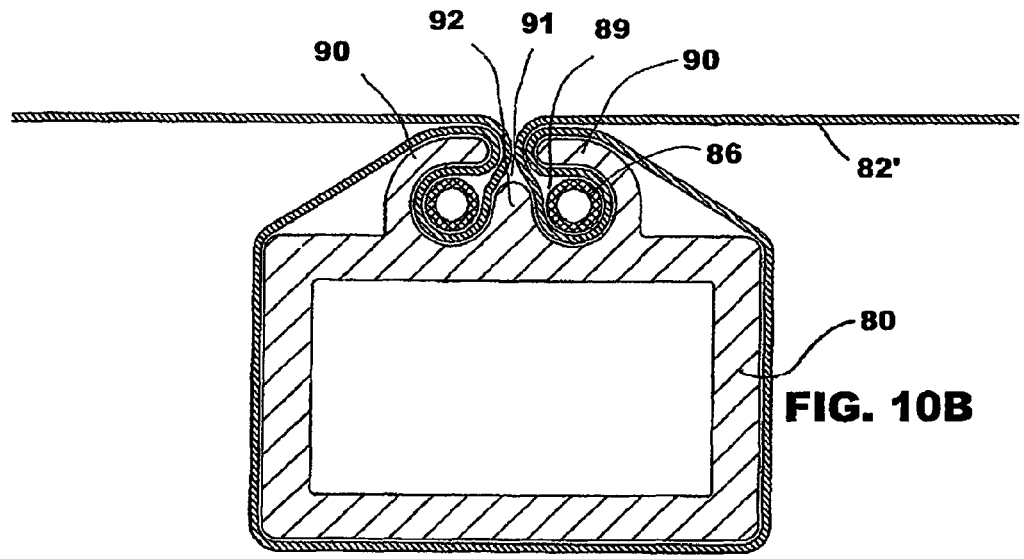
FIG. 10B is a cross sectional view of a supporting bow and a single piece tarp connected at two separate connection points according to another embodiment of the present invention.
Figure 10C:
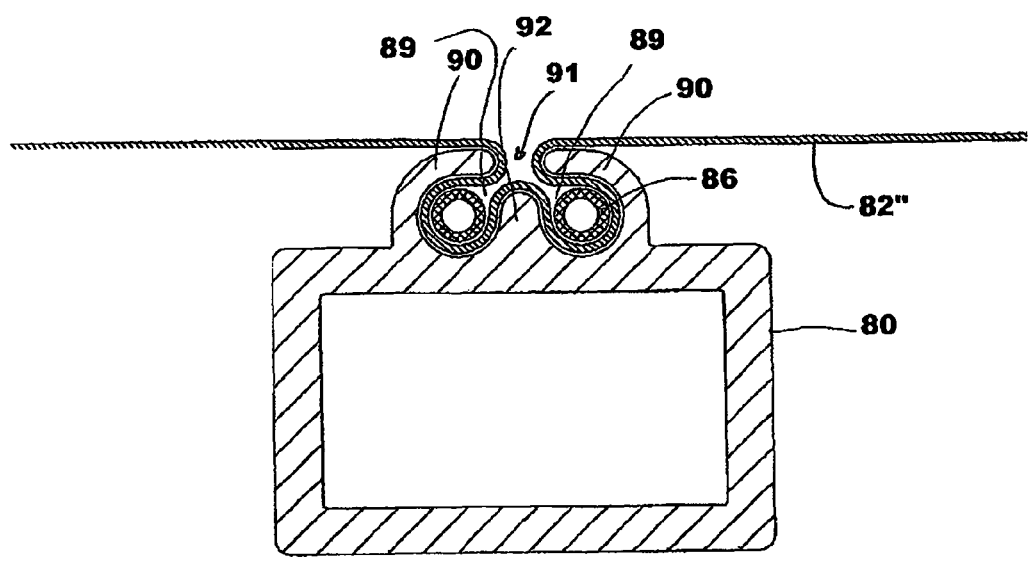
FIG. 10C is a cross sectional view of a supporting bow and a single piece tarp connected at two separate connection points according to yet another embodiment of the present invention.
Figure 13A:
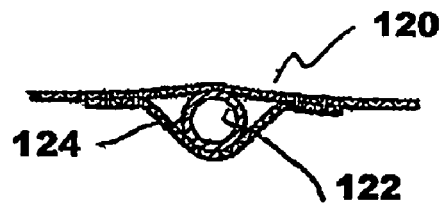
FIG. 13A is a cross sectional view of a single piece tarp connected to a supporting bow according to a conventional construction.
Figure 13B:
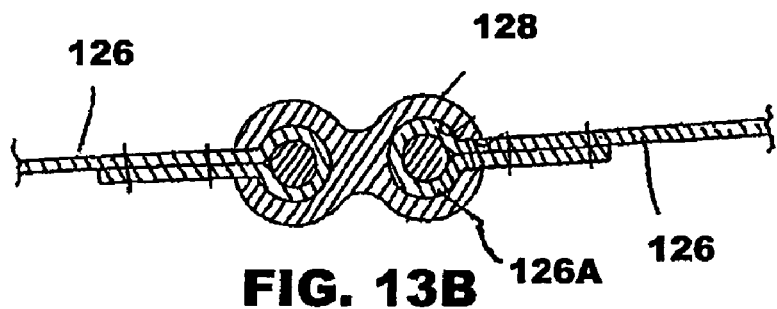
FIG. 13B is a cross sectional view of two sections of a sectional tarp connected to a hollow supporting bow according to a conventional construction.
Figure 13C:
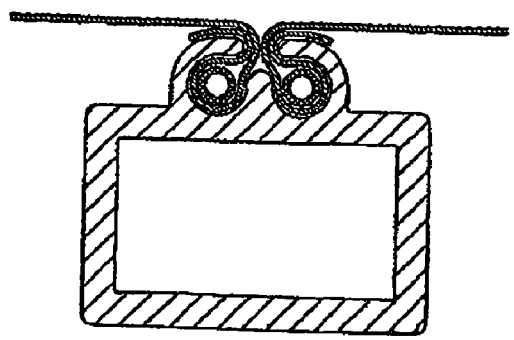
FIG. 13C is a cross sectional view of two sections of a sectional tarp connected to a supporting bow according to a previously proposed design by applicant.

Shown in FIGS. 10A-10C are three embodiments of a single piece tarp 82 as connected to a bow with an integral connector according to the invention. In each of these embodiments the bow 80, or portions thereof, may include an integral connector that gives the bow 80 the desired cross sectional shape, and the bow may have the same shape as applicant's previously proposed system shown in FIG. 13C. However, unlike the previous system, the tarp 82 is provided as a single, unitary member when completely assembled and the bow 80 is connected to two portions of the tarp cover 82 which are spaced from each other in a direction perpendicular to a longitudinal direction of the bow 80. Again, for example, in a rolling-type tarpaulin system for flatbed trailers, including U-shaped tarp supporting bows, the bows may function as the connectors, and upper central portions of the bows which extend transversely and substantially horizontally over the trailer bed may be connected to two portions of said tarp cover spaced from each other in a longitudinal direction of the trailer.

With reference to FIG. 10A, the tarp cover 82 may initially be formed in sections 84 each of which is connected between a pair of the bows 80, and after a pair of the sections 84 are connected to each of the bows 80, the edges of the two sections are connected to each other at section edges 85 which is a lower/inner face of the bow to form the unitary tarp cover, e.g., the section edges 85 may be bonded to each other in an overlapped condition as shown such that the tarp cover 82 essentially surrounds the bow 80. Bonding of the tarp sections 84 at edges 85 may be achieved using any number of methods, such as heat to partially melt and fuse the edges together, using adhesive, sonic welding, and/or by any other appropriate means. Connections between the bow 80 and the tarp cover 82 may be achieved by folding intermediate portions of tarp sections 84 over respective lengths of plastic tubing 86, lengths of rope, etc., and then inserting/sliding the folded portions of the tarp sections 84 with the tubing 86 into the lobes 89 formed by arms 90 and node 92 that form an opening 91 in the bow connector. As thus inserted into the lobe 89, the tarp sections 84 are securely retained by the bow. Optionally, the tarp sections could be sewn where folded over near the tubing 86 to retain the tubing at specific locations relative to the tarp sections.

Such tarp enclosure system including a single unitary tarp as shown in FIG. 10A desirably combines advantages of a single piece tarp cover system, including a high degree of water-tightness, with ease of maintenance conventionally associated with a sectional tarp cover system. Water-tightness is achieved because there are no gaps or openings formed along the single piece tarp such that water cannot pass through the tarp unless the tarp becomes damaged. Of course the material used in forming the tarp cover 84 could be porous or mesh if so desired. Further, because the tarp cover surrounds or encloses the bows 80, any condensation which may form on the bows is captured by the surrounding section of the tarp cover and may be safely channeled away from the cargo space below/within the tarp system. Also, because the tarp cover is formed as a unitary member, the conventional problem of tarp segments shifting relative to each other is prevented. Because the overlapped, bonded portions of the tarp cover are disposed on the inside of the bows 80, these portions do not detract from the outward appearance of the tarp cover system and the tarp appears smooth and continuous.

On the other hand, because the tarp cover 82 is connected to each bow 80 at two spaced portions of the tarp cover, if a section of the tarp cover is ripped or otherwise becomes damaged, that section may be readily removed and replaced by cutting the tarp cover near each of two adjacent bows 80 bordering the damaged section, disconnecting the damaged section from the adjacent bows by sliding the opposite sides of the section out of the retaining lobes 89 of the openings 91 in the adjacent bows, and then similarly connecting opposite sides of a new replacement section of tarp material to the two adjacent bows in place of the section that was removed. In the embodiment of FIG. 10A, for example, a knife can be run along the inside face of each of the adjacent bows 80 at or near where the tarp sections overlap, and after a new section is connected to the adjacent bows, the two edges of the replacement section may then be bonded to edges of the tarp cover formed when it was cut such that the tarp cover again becomes a single unitary member.

Figure 14:
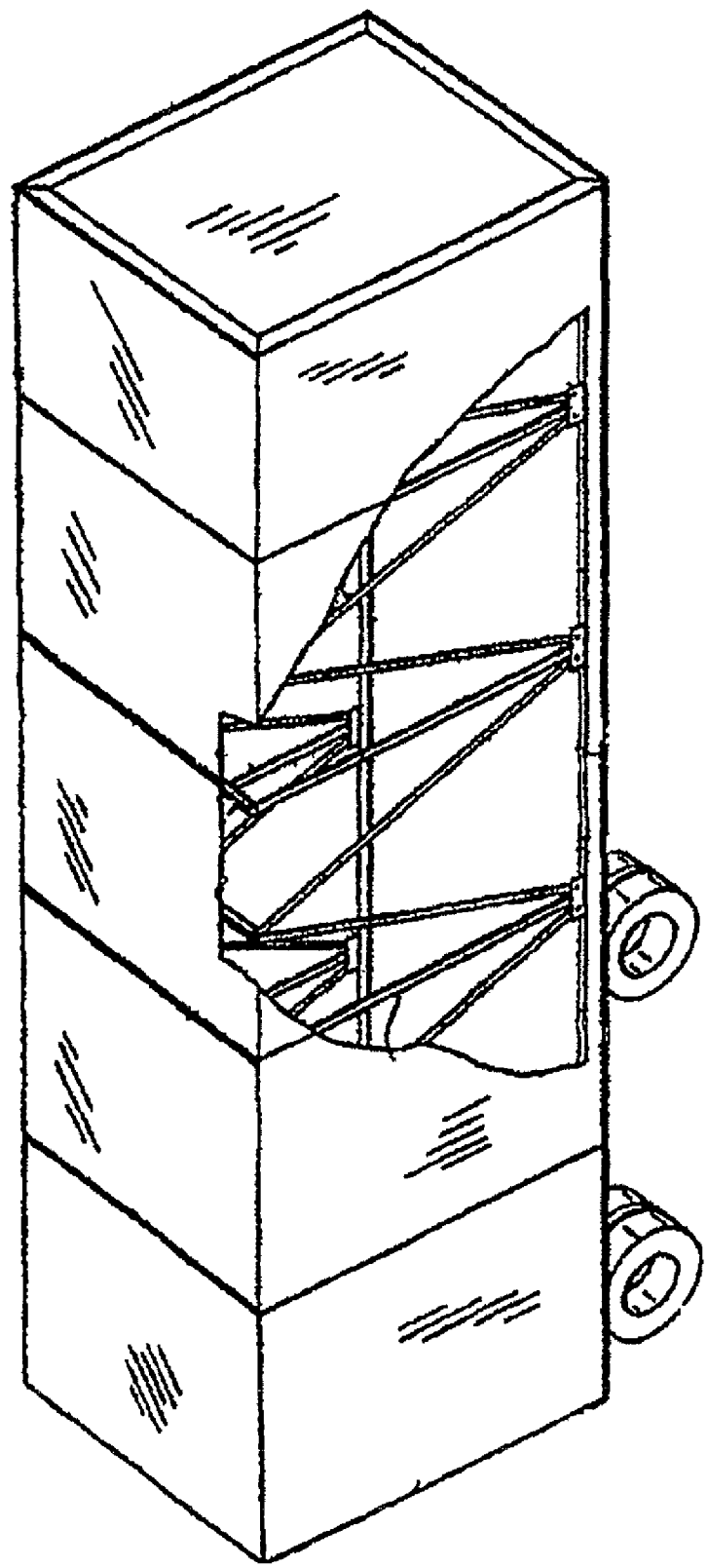
FIG. 14 is a perspective view, partially in section, of a rolling-type, tensioned tarpaulin system previously proposed by applicant for a large truck-trailer.

In a tarpaulin cover system that has U-shaped bows, such as the truck trailer mounted system shown in FIG. 14, problems of water leakage and/or condensation may only relate to the upper or horizontal portion of the tarp cover, and correspondingly, only the upper or horizontal portions of the supporting bows may be enclosed by the unitary tarp cover as shown in FIG. 10A.

With reference to FIG. 10B, the single unitary tarp cover 82' surrounds the bow 80 and the bow 80 is connected to two portions of the tarp cover which are spaced from each other in a direction perpendicular to a longitudinal direction of the bow in a manner very similar to the tarp cover 82 in FIG. 10A with similar connections by tubing 86 in lobes 89 formed by arms 90 and node 92. But the tarp cover 82' in this embodiment is initially formed and connected to the bows 80 as a single, unitary member, rather than being formed in sections which are then bonded together after being connected to the bow 80. If a section of the tarp cover 82' becomes damaged, it can easily be replaced in the same manner as discussed in relation to the embodiment of FIG. 10A, and after installing the replacement section the unitary tarp cover 82 will have overlapped bonded portions such as shown in FIG. 10A. The embodiment of FIG. 10B achieves the same advantages as discussed in relation to the embodiment of FIG. 10A.

With reference to FIG. 10C, the bow 80 is connected to two portions of a single piece, unitary tarp cover 82" which are spaced from each other in a direction perpendicular to a longitudinal direction of the bow, just as in the embodiments of FIGS. 10A, 10B, but here the tarp cover does not enclose the bow 80, but only covers the outside face of the bow.

If a section of the tarp 82" becomes damaged, it can easily be replaced, but in a slightly different manner than with the embodiments of FIGS. 10A, 10B. For example, if a section becomes damaged, the tarp may be cut at a point between the two arms 90 of the opening 91 in each of the two adjacent bows bounding the damaged section, edges of the damaged section may then be slidingly removed from the retaining lobes 89 of the adjacent bows, and then a replacement section of tarp material may then be installed by sliding its opposite side edges into the retaining lobes 89 of the adjacent bows 80. If desired, each of the opposite side edges of the replacement section may be folded over and then sewn or bonded to itself to form a pocket which securely retains the tubing 86 or other appropriate member therein. This would facilitate sliding insertion of the edges into the retaining lobes 89 of the bow 80. Similarly, the cut edges of the tarp cover which remain connected to the bows 80 when a damaged section of the cover 82" is replaced may be folded and sewn or bonded to form pockets for retaining the tubing 86 or other appropriate member therein.

Two or more of the embodiments of the present invention may be used together in a movable tarpaulin system such as the truck trailer mounted system shown in FIG. 14. For example, the first embodiment may be used at the front of the system, the second, third or fourth embodiment may be used at the rear of the system and any of the unitary tarp covers may be used as the cover of the system. Of course, the embodiments may be used separately from each other or only portions of an embodiment may be used with another embodiment. Although each of the first-fourth embodiments above apply a tensioning force to the end bow, it is not necessary to tension a tarp cover system at both front and rear ends. Thus, for example, the first embodiment could be used to lock and tension the front end of a tarp cover system, while the rear end bow of the system may simply be locked in place using a locking, but non-tensioning, device 42' shown in FIG. 7B, and without use of a tensioning mechanism 30 or 60 as discussed above.

While the bows 14, 36, 38 or 80 are discussed above as being substantially U-shaped and supported on a truck trailer or the like, it will be understood that the bows need not be U-shaped and that the cover system need not be mounted on a flatbed truck trailer. Instead, the cover system could be used to cover any area where weatherproofing or security is desired. For example, loose materials, such as sand, are often retained in an area that has three side walls and an open end. This enclosed area usually very large and open to the weather. It would not be cost effective to store such material in a building but it is desirable to prevent wind and rain from removing the loose materials from the stockpile. A pair of guide rails 45 could be placed along the side walls and a tarp system in accordance with the invention could provide a weatherproof enclosure for the materials. Alternatively, the guide rails 45 could be secured to the ground to protect any desired area. The bows could be any desired width and any desired number of bows could be provided to cover a desired length.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

For example, while the bow supporting carriages in the disclosed embodiments are wheeled carriages that roll along guide rails disposed at opposite sides of the cover system, the carriages need not be wheeled carriages. Instead the carriages my include sliding members which slide along the guide rails, pressurized air from an appropriate source may be injected between the guide rails and the carriages for facilitating sliding movement of the carriages along the rails, etc.

What is claimed is:

1. A retractable tarpaulin cover system comprising:
   a tarp cover;

plural spaced substantially U-shaped bows supporting and connected to the tarp cover, movable carriages operably connected to lower ends of each bow, and a tensioning mechanism which moves an end one of said bows toward an endmost position thereof to tension the tarp cover in an expanded position of the cover, wherein said tensioning mechanism includes an elongate brace arm having an upper end which operatively engages an upper or intermediate portion of a vertically extending leg of the end bow, a transmission device which operatively supports a lower end of the brace arm and rotates the arm in a longitudinal direction of the cover system to thereby also move the end bow in the longitudinal direction of the cover system, and a coupling which detachably connects the lower end of the brace arm to the transmission device.

2. The retractable tarpaulin cover system according to claim 1, wherein the tensioning mechanism includes a first gear which is connected to the lower end of the brace arm by the coupling, and a second gear which may be selectively driven by a power source and is operatively connected to the first gear for rotating the first gear.

3. The retractable tarpaulin cover system according to claim 1, wherein the tensioning mechanism further includes a motor which drives said first gear and a remote control device which actuates the motor.

4. The retractable tarpaulin cover system according to claim 1, wherein the upper end of the brace arm has a hooked recess which engages the vertically extending leg of the end bow, and the brace arm has a length which his greater than a normal height of the engaged portion of the leg of the end bow such that the brace arm lifts the engaged portion above its normal height when the end bow is in the endmost position thereof.

5. A retractable tarpaulin cover system comprising:

a tarp cover;

plural spaced substantially U-shaped bows supporting and connected to the tarp cover, and movable carriages operably connected to lower ends of each bow, wherein the tarp cover extends continuously in a longitudinal direction of the cover system, and intermediate ones of said bows are each connected to two portions of the tarp cover spaced from each other in the longitudinal direction of the cover system;

wherein the tarp cover is wrapped around and substantially encloses portions of said bows.

\* \* \* \* \*